US011803376B2

(12) United States Patent
Nehashi

(10) Patent No.: US 11,803,376 B2
(45) Date of Patent: Oct. 31, 2023

(54) PROGRAMMING SUPPORT APPARATUS FOR DEVELOPING A USER PROGRAM TO BE EXECUTED BY A PROGRAMMABLE LOGIC CONTROLLER

(71) Applicant: Keyence Corporation, Osaka (JP)

(72) Inventor: Yui Nehashi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 79 days.

(21) Appl. No.: 17/674,944

(22) Filed: Feb. 18, 2022

(65) Prior Publication Data

US 2022/0318007 A1  Oct. 6, 2022

(30) Foreign Application Priority Data

Apr. 1, 2021  (JP) ................................. 2021-062987

(51) Int. Cl.
*G06F 8/77* (2018.01)
*G06F 9/54* (2006.01)

(52) U.S. Cl.
CPC ................ *G06F 8/77* (2013.01); *G06F 9/547* (2013.01)

(58) Field of Classification Search
None
See application file for complete search history.

(56) References Cited

U.S. PATENT DOCUMENTS

| 10,983,743 | B2 | 4/2021 | Fujimura et al. |
| 10,986,266 | B2 | 4/2021 | Tsujikawa |
| 11,188,048 | B2 | 11/2021 | Miyasaka |
| 2012/0265838 | A1* | 10/2012 | Nakano .................. H04L 67/06 709/212 |
| 2016/0253234 | A1* | 9/2016 | Nakaminami ...... G06F 11/0751 714/19 |

(Continued)

FOREIGN PATENT DOCUMENTS

JP  2020166827 A  10/2020

OTHER PUBLICATIONS

U.S. Appl. No. 17/674,919, filed Feb. 18, 2022 (95 pages).
U.S. Appl. No. 17/674,926, filed Feb. 18, 2022 (93 pages).

*Primary Examiner* — Qing Chen
(74) *Attorney, Agent, or Firm* — Kilyk & Bowersox, P.L.L.C.

(57) ABSTRACT

To provide a programming support apparatus including an integrated development environment in which a development environment for developing a user program to be executed by a PLC is integrated with a development environment of a display screen. A programming supporting apparatus includes a providing section that provides an integrated development environment in which a non-web application-based first development environment supporting development of a user program to be transferred to and executed by the programmable logic controller is integrated with a web application-based second development environment supporting development of a display screen by generating the display screen, which displays a symbol value collected from a symbol used in accordance with the user program in the programmable logic controller, as a web page that is described by data describing a structure, data describing a decoration, and a code describing dynamic processing.

20 Claims, 20 Drawing Sheets

(56) References Cited

U.S. PATENT DOCUMENTS

| | | |
|---|---|---|
| 2019/0018385 A1* | 1/2019 | Soneda .................. G05B 19/05 |
| 2020/0125060 A1* | 4/2020 | Fujimura ............. G05B 19/056 |
| 2021/0103264 A1 | 4/2021 | Nakamura |
| 2021/0103265 A1 | 4/2021 | Fujimura |
| 2021/0240154 A1 | 8/2021 | Miyasaka |
| 2021/0364996 A1 | 11/2021 | Miyasaka |

* cited by examiner

PROGRAMMING SUPPORT APPARATUS FOR DEVELOPING A USER PROGRAM TO BE EXECUTED BY A PROGRAMMABLE LOGIC CONTROLLER

CROSS-REFERENCE TO RELATED APPLICATIONS

The present application claims foreign priority based on Japanese Patent Application No. 2021-062987, filed Apr. 1, 2021, the contents of which are incorporated herein by reference.

BACKGROUND OF THE INVENTION

1. Field of the Invention

The present invention relates to a programming support apparatus.

2. Description of Related Art

A programmable logic controller (PLC) is a controller that controls industrial machines such as manufacturing equipment, conveyance apparatuses, and inspection apparatuses in factory automation. The PLC controls various expansion units and controlled equipment by executing a user program such as a ladder program created by a programmer.

In order to monitor an operation of the PLC, it is proposed to collect data held by the PLC and monitor the data in real time with an HMI (human machine interface: display apparatus) connected to the outside of the PLC (JP 2020-166827 A).

Meanwhile, the HMI of the PLC is configured to display bitmap data, and a display program and display settings for the HMI have been created by a programming support apparatus using dedicated software. The programming support apparatus is achieved by a personal computer (PC) or an industrial computer (IPC). On the other hand, instead of the HMI installed near the PLC, it may be convenient if the PLC can be accessed from a PC located away from the PLC and data of the PLC can be monitored in real time. In particular, if the data of the PLC can be displayed using a web-based technology, any PC equipped with a web browser can be used as a real-time monitoring apparatus for the PLC. Such a monitoring apparatus or display apparatus will be referred to as WebHMI.

Meanwhile, the programming support apparatus has a PC application-based software development environment to create a user program such as a ladder program to be executed by the PLC. In addition, the programming support apparatus sometimes have a separately installed software development environment for the HMI or WebHMI. Conventionally, these two software development environments are independent, and a user start them individually to develop software for the PLC and software for the WebHMI, so that the development efficiency is poor.

SUMMARY OF THE INVENTION

Therefore, an object of the present invention is to provide a programming support apparatus including an integrated development environment in which a development environment for developing a user program to be executed by a PLC is integrated with a development environment of a display screen.

According to one embodiment of the invention, for example, provided is a programming supporting apparatus including: a communication section that communicates with a programmable logic controller; and a providing section that provides an integrated development environment in which a non-web application-based first development environment that supports development of a user program to be transferred to the programmable logic controller via the communication section and executed is integrated with a web application-based second development environment that supports development of a display screen by generating the display screen, which displays a symbol value collected from a symbol used in accordance with the user program in the programmable logic controller, as a web page that is described by data describing a structure, data describing a decoration, and a code describing dynamic processing.

According to the one embodiment of the invention, provided is the programming support apparatus including the integrated development environment in which the development environment for developing the user program to be executed by the PLC is integrated with the development environment of the display screen.

DETAILED DESCRIPTION OF PREFERRED EMBODIMENTS

Hereinafter, an embodiment will be described in detail with reference to the accompanying drawings. Note that the following embodiment does not limit the invention according to the claims, and all combinations of characteristics described in the embodiment are not necessarily essential for the invention. Two or more characteristics of the plurality of characteristics described in the embodiment may be arbitrarily combined. In addition, the same or similar configurations are denoted by the same reference signs, and redundant descriptions thereof are omitted. A lower-case alphabet is sometimes added to ends of reference signs indicating the same or similar elements. When matters common to the plurality of elements are described, the lower-case alphabet is omitted <System Configuration>

First, in order to enable whose skilled in the art to better understand a programmable logic controller (PLC, which may be simply referred to as a programmable controller), a configuration of a general PLC and the operation thereof will be described.

Figure 1:
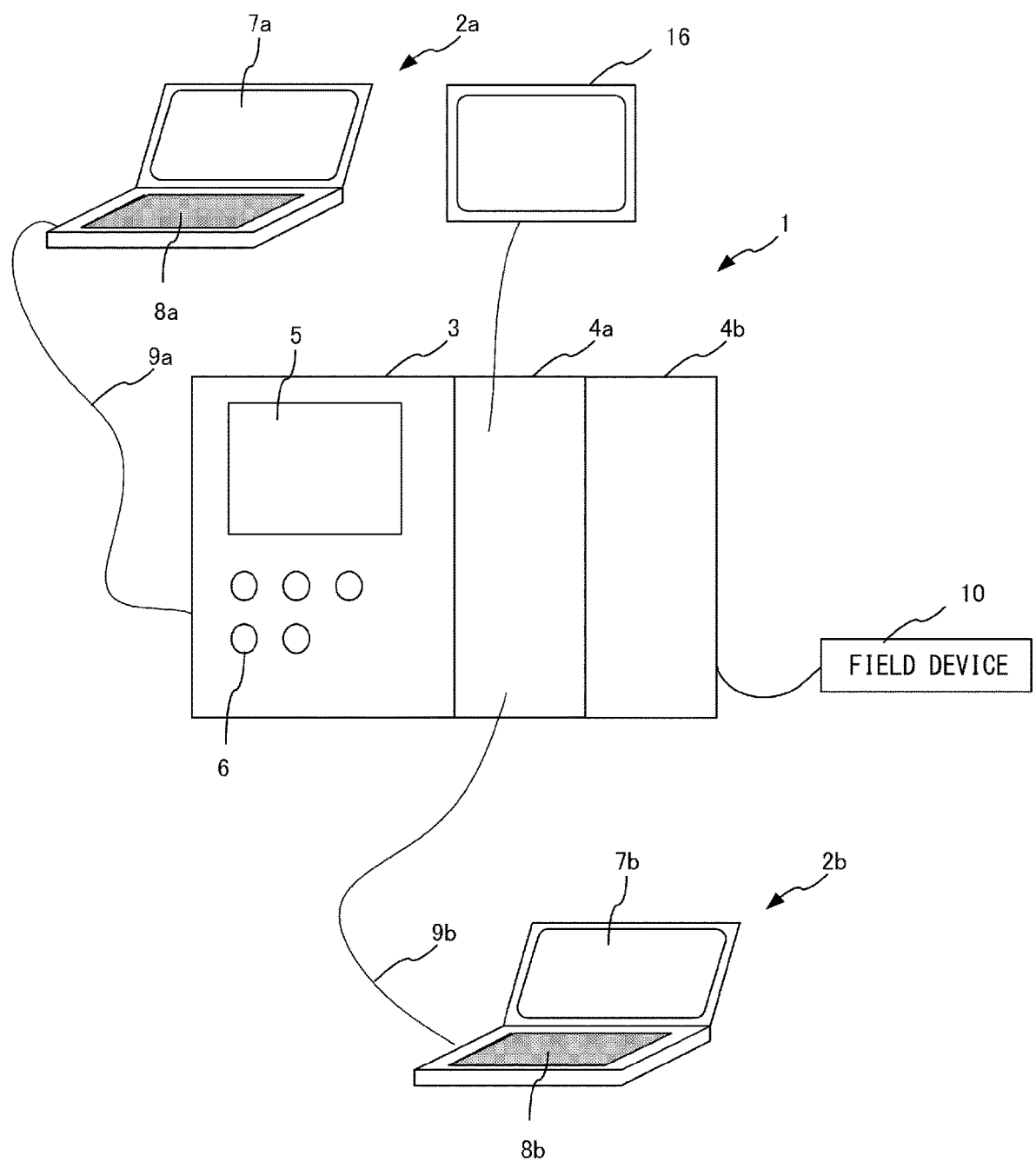
FIG. 1 is a diagram illustrating a PLC system.

FIG. 1 is a conceptual diagram illustrating a configuration example of a programmable logic controller system according to an embodiment of the present invention. As illustrated in FIG. 1, the system includes: a PC 2a configured to edit a user program such as a ladder program; and a PLC (programmable logic controller) 1 configured for the integrated control of various control apparatuses installed in a factory or the like. The PC is an abbreviation for personal computer. The user program may be created using a graphical programming language such as a ladder language and a flowchart-format motion program such as a sequential function chart (SFC), or may be created using a high-level programming language such as C language. Hereinafter, the user program executed by a basic unit 3 is assumed to be the ladder program for convenience of the description. The PLC 1 includes the basic unit 3 incorporating a CPU, and one or a plurality of expansion units 4. The one or plurality of expansion units 4 are detachable from the basic unit 3.

The basic unit 3 includes a display part 5 and an operation part 6. The display part 5 is a display apparatus that displays an operation status and the like of each of the expansion units 4 attached to the basic unit 3. The display part 5 switches a display content according to an operation content of the operation part 6. The display part 5 typically displays a current value (device value) of a device in the PLC 1, error information generated in the PLC 1, and the like. The device is a name indicating an area on a memory provided to store a device value (device data), and may be referred to as a device memory. The device value is information indicating an input state from input equipment, an output state to output equipment, or a state of an internal relay (auxiliary relay), a timer, a counter, a data memory, or the like set on the user program. Types (symbol types) of the device value include a bit type and a word type. The bit device stores a 1-bit device value. A word device stores a device value of one word. The operation part 6 includes a button, a switch, and the like configured to input a user instruction with respect to the basic unit 3. The PLC 1 may be configured to handle a variable as well as the device. The device and the variable are referred to as symbols, and a current value of a symbol is referred to as a symbol value.

The expansion unit 4 is prepared for expanding a function of the PLC 1. Afield device (controlled apparatus) 10 corresponding to a function of the expansion unit 4 is sometimes connected to each of the expansion units 4, whereby each field device 10 is connected to the basic unit 3 via the expansion unit 4. The field device 10 may be input equipment such as a sensor and a camera, or may be output equipment such as an actuator. In addition, a plurality of field devices may be connected to one expansion unit 4.

For example, the expansion unit 4b may be a positioning unit that drives a motor (the field device 10) to position a workpiece, or may be a counter unit. The counter unit counts a signal from an encoder (the field device 10) such as a manual pulsar.

The expansion unit 4a is a data collection unit that executes a data utilization program, which is the user program, to collect collection target data from the basic unit 3 and the expansion unit 4b, perform data processing on the collection target data to create display target data, and create display data for displaying a dashboard on the display part 7 or the PC 2. The basic unit 3 is sometimes also referred to as the CPU unit. Note that the system including the PLC 1 and the PC 2 may be referred to as the programmable logic controller system.

The PC 2a is a computer that is operated mainly by a programmer. On the other hand, the PC 2b is a computer that is operated by a field manager and the like. The PC 2a may be referred to as a programming support apparatus (setting apparatus). The PC 2 is, for example, a portable notebook type or tablet type personal computer or a smartphone, and is an external computer including a display part 7 and an operation part 8. The external computer is a computer outside the PLC 1. The ladder program, which is an example of the user program configured to control the PLC 1, is created using the PC 2a. The created ladder program is converted into a mnemonic code in the PC 2a. The PC 2 is connected to the basic unit 3 of the PLC 1 via a communication cable 9 such as a universal serial bus (USB) cable. For example, the PC 2a sends the ladder program converted into the mnemonic code to the basic unit 3. The basic unit 3 converts the ladder program into a machine code and stores the machine code in a memory provided in the basic unit 3. Note that the mnemonic code is transmitted to the basic unit 3 here, the present invention is not limited thereto. For example, the PC 2a may convert the mnemonic code into an intermediate code, and send the intermediate code to the basic unit 3.

Note that the operation part 8 of the PC 2 may include a pointing device such as a mouse connected to the PC 2 although not illustrated in FIG. 1. In addition, the PC 2 may be configured to be detachably connected to the basic unit 3 of the PLC 1 via another communication cable 9 other than the USB cable. In addition, the PC 2 may be connected to the basic unit 3 of the PLC 1 by wireless communication without using the communication cable 9.

A human machine interface (HMI) 16 is a display apparatus that reads and displays information stored in a device or a buffer of the PLC 1. The HMI 16 may include, for example, a touch panel type input apparatus. When the HMI 16 is equipped with a web browser, the HMI 16 functions as WebHMI.

<Programming Support Apparatus>

Figure 2:
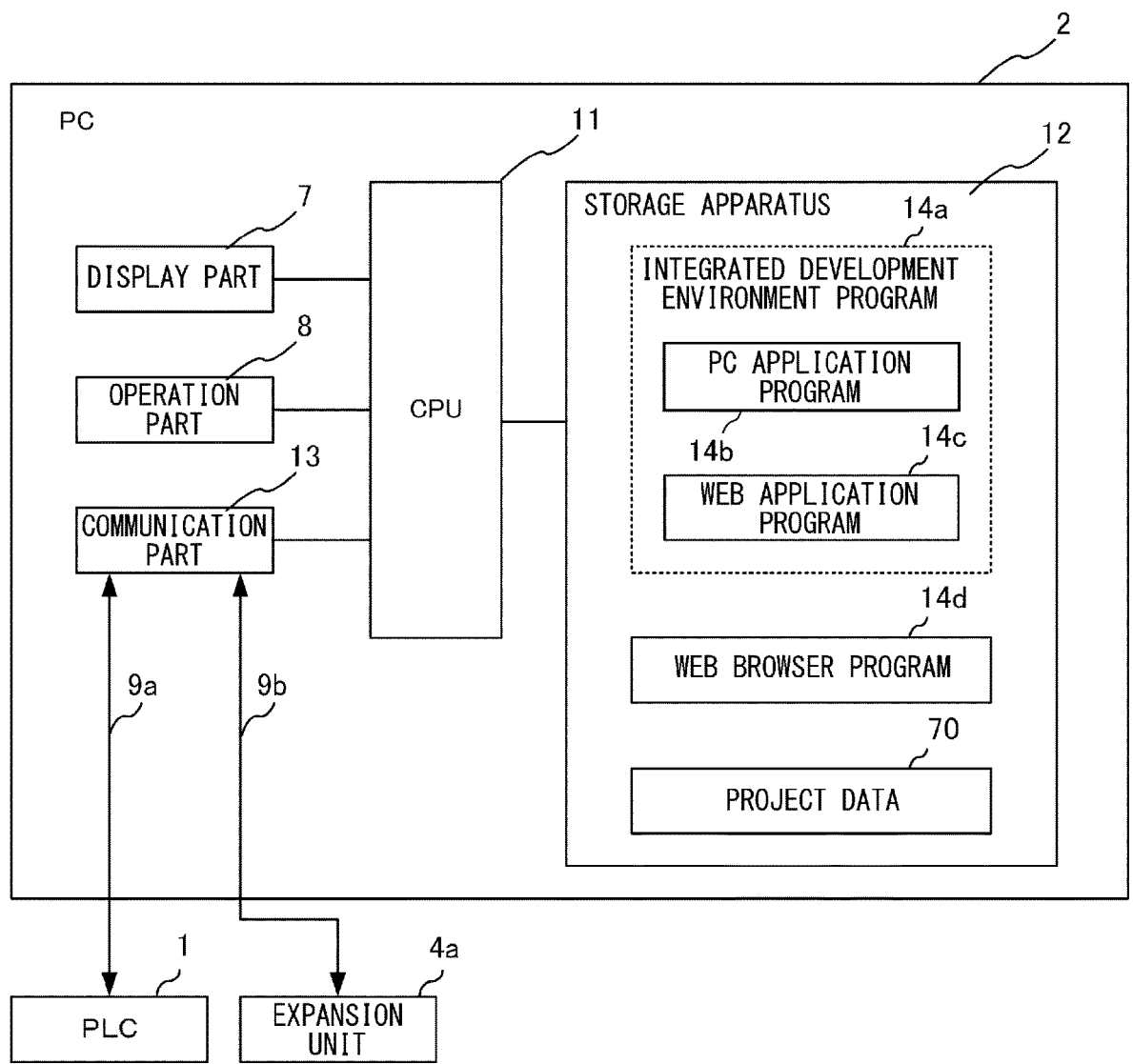
FIG. 2 is a diagram illustrating a PC.

FIG. 2 is a block diagram illustrating an electrical configuration of the PC 2. As illustrated in FIG. 2, the PC 2 includes a CPU 11, the display part 7, the operation part 8, a storage apparatus 12, and a communication part 13. The display part 7, the operation part 8, the storage apparatus 12, and the communication part 13 are electrically connected to the CPU 11. The storage apparatus 12 includes a RAM, a ROM, an HDD, and an SSD, and may further include a detachable memory card. The CPU is an abbreviation for central processing unit. The ROM is an abbreviation for read-only memory. The RAM is an abbreviation for random access memory. The HDD is an abbreviation for hard disk drive. The SSD is an abbreviation of solid state drive.

The storage apparatus 12 stores an integrated development environment program 14a and a web browser program 14d. The integrated development environment program 14a is software that provides an integrated development environment in which a PLC development environment that supports development of a user program (for example, a ladder program) to be transferred to the PLC 1 and executed is integrated with a WebHMI development environment that supports development of a display screen, which displays a symbol value collected from a symbol (e.g., a device and a variable) used when the user program is executed in the PLC 1. The integrated development environment is achieved as the user of the PC 2a executes the integrated development environment program 14a on the CPU 11. The PLC development environment is achieved by a PC application program 14b. The PC application program 14b is a program that depends on an operating system (OS) of a PC, such as win32. The PC application program 14b only needs to be a program other than a web application-based program, and may be a program that does not depend on an OS, for example. The WebHMI development environment is achieved by a web application program 14c. The web application program 14c is a web application-based program, and thus, a program that does not depend on an OS. Therefore, the web application program 14c can be executed by both an embedded browser provided in the integrated development environment program 14a and a general-purpose web browser. The web browser program 14d is a general-purpose browser configured to make the CPU 11 function as a web browser.

The user edits project data 70 by operating the operation part 8 in an integrated development environment 50. The project data 70 includes one or more user programs (e.g., a ladder program), configuration information of the basic unit 3 and the expansion unit 4, drawing data of the WebHMI, the data utilization program to be executed by expansion unit 4a, definition information of a symbol, and the like. The configuration information is information indicating connection positions of the plurality of expansion units 4 with respect to the basic unit 3 or indicating functions provided in the basic unit 3 (e.g., a communication function and a positioning function), and information indicating functions of the expansion unit 4 (e.g., a photographing function) and the like. The drawing data is a display component group configured to implement WebHMI, and is achieved by markup data describing a structure of a front end (e.g., HTML data), style sheet data describing a decoration (e.g., CSS data), and a code describing dynamic processing (e.g., JavaScript (registered trademark) code). Note that the front end refers to a portion that is directly visible to the user in a web page, a web service, and a web application. The style sheet data describing the decoration may be provided, for example, in a file format. In this case, the style sheet data may be called by a description that calls an external style sheet data file in the markup data describing the structure. The code describing the dynamic processing may be provided, for example, in a file format. In this case, the code describing the dynamic processing may be called by a description that calls an external code file in the markup data describing the structure. The front end in a format that can call and use the external style sheet data file and the external code file has high reusability and maintainability, and for example, a general-purpose front end component or the like can be used. When such a general-purpose and highly reusable web drawing technology is adopted, components can be reused in development of WebHMI and the like, and the maintainability of WebHMI and the like can be also improved. Hereinafter, the drawing data is referred to as a display component. The data utilization program includes a program configured to collect control data (such as device values) in the PLC 1, process data, and create data to be passed to WebHMI.

The editing of the project data 70 includes creating and changing (re-editing) of the project data 70. The user reads the project data 70 stored in the storage apparatus 12 as necessary, and changes the project data 70 using the integrated development environment program 14a.

The communication part 13 communicates with the basic unit 3 via a communication cable 9a. The CPU 11 transfers the project data 70 to the basic unit 3 via the communication part 13. The communication part 13 communicates with the expansion unit 4a via a communication cable 9b. The CPU 11 transfers the project data 70 to the expansion unit 4a via the communication part 13. Note that the basic unit 3 may transfer data required by the expansion unit 4a in the project data 70 to the expansion unit 4a.

<PLC>

Figure 3:
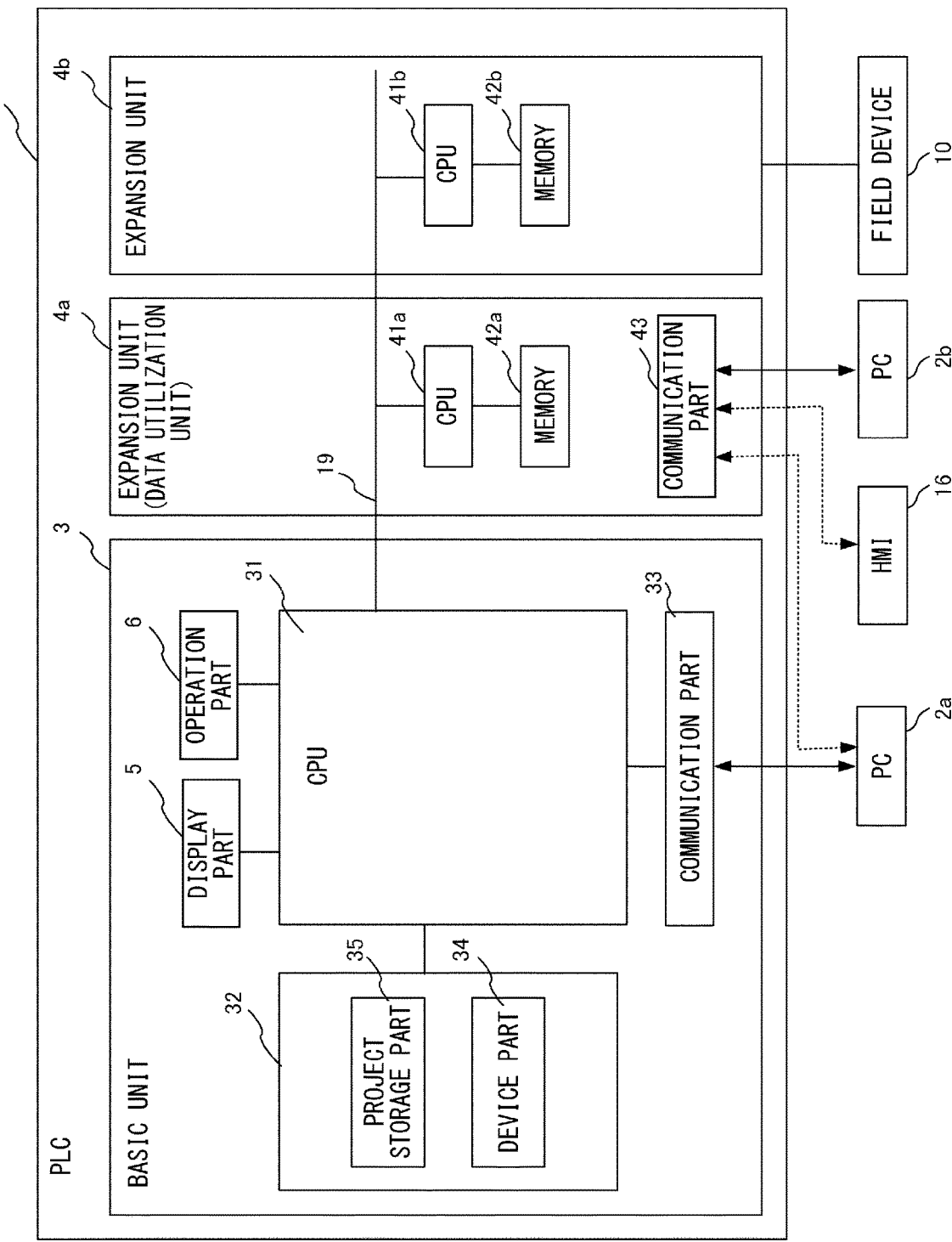
FIG. 3 is a diagram illustrating a PLC.

FIG. 3 is a block diagram illustrating an electrical configuration of the PLC 1. As illustrated in FIG. 3, the basic unit 3 includes a CPU 31, the display part 5, the operation part 6, a storage apparatus 32, and a communication part 33. The display part 5, the operation part 6, the storage apparatus 32, and the communication part 33 are electrically connected to the CPU 31. The storage apparatus 32 may include a RAM, a ROM, a memory card, and the like. The storage apparatus 32 includes a plurality of storage areas such as a device part 34 and a project storage part 35. The device part 34 includes a bit device, a word device, and the like, and each of the devices stores a device value. The project storage part 35 stores the project data 70 input from the PC 2a. As illustrated in FIG. 3, the basic unit 3 and the expansion unit 4 are connected via a unit internal bus 19 which is a type of expansion bus. Note that a communication function related to the unit internal bus 19 is mounted on the CPU 31, but may be mounted as a part of the communication part 33. The communication part 33 may include a network communication circuit. The CPU 31 receives the project data 70 from the PC 2a via the communication part 33.

Here, the unit internal bus 19 will be supplementarily described. The unit internal bus 19 is a communication bus used for input/output refresh. The input/output refresh is processing of updating the device value between the basic unit 3 and the expansion unit 4. The input/output refresh is executed every time the ladder program is executed once (that is, every scan).

The expansion unit 4 includes a CPU 41 and a memory 42. A CPU 41b of the expansion unit 4b controls the field device 10 according to an instruction (device value) from the basic unit 3 stored in the device. In addition, the CPU 41b stores a control result of the field device 10 in a device called a buffer memory. The control result stored in the device is transferred to the basic unit 3 by the input/output refresh. In addition, the control result stored in the device is sometimes transferred to the basic unit 3 according to a read command from the basic unit 3 even at a different timing from the input/output refresh. The memory 42 includes a RAM, a ROM, and the like. In particular, a storage area used as the buffer memory is secured in the RAM. The memory 42 may have a buffer that temporarily holds data (e.g., still image data or moving image data) acquired by the field device 10.

A CPU 41a of the expansion unit 4a functioning as a data utilization unit communicates with the PC 2a via a communication part 43 and the cable 9b. The data utilization unit is an expansion unit that executes the data utilization program. The CPU 41a stores the data utilization program and its setting data received from the PC 2a in a memory 42a. The CPU 41a executes the data utilization program according to the setting data, collects a device value, and creates display data to be displayed on the WebHMI. The CPU 41a communicates with the PC 2b via the communication part 43 and the cable 9b. The CPU 41a transmits the display data of the WebHMI to the PC 2b. As a result, the PC 2b displays the WebHMI including various types of data related to the PLC 1.

The HMI 16 may also be connected to the communication part 43 and communicate with the CPU 41a via the communication part 43. The HMI 16 receives display data from the CPU 41a and displays the display data as the WebHMI.

Figure 4:
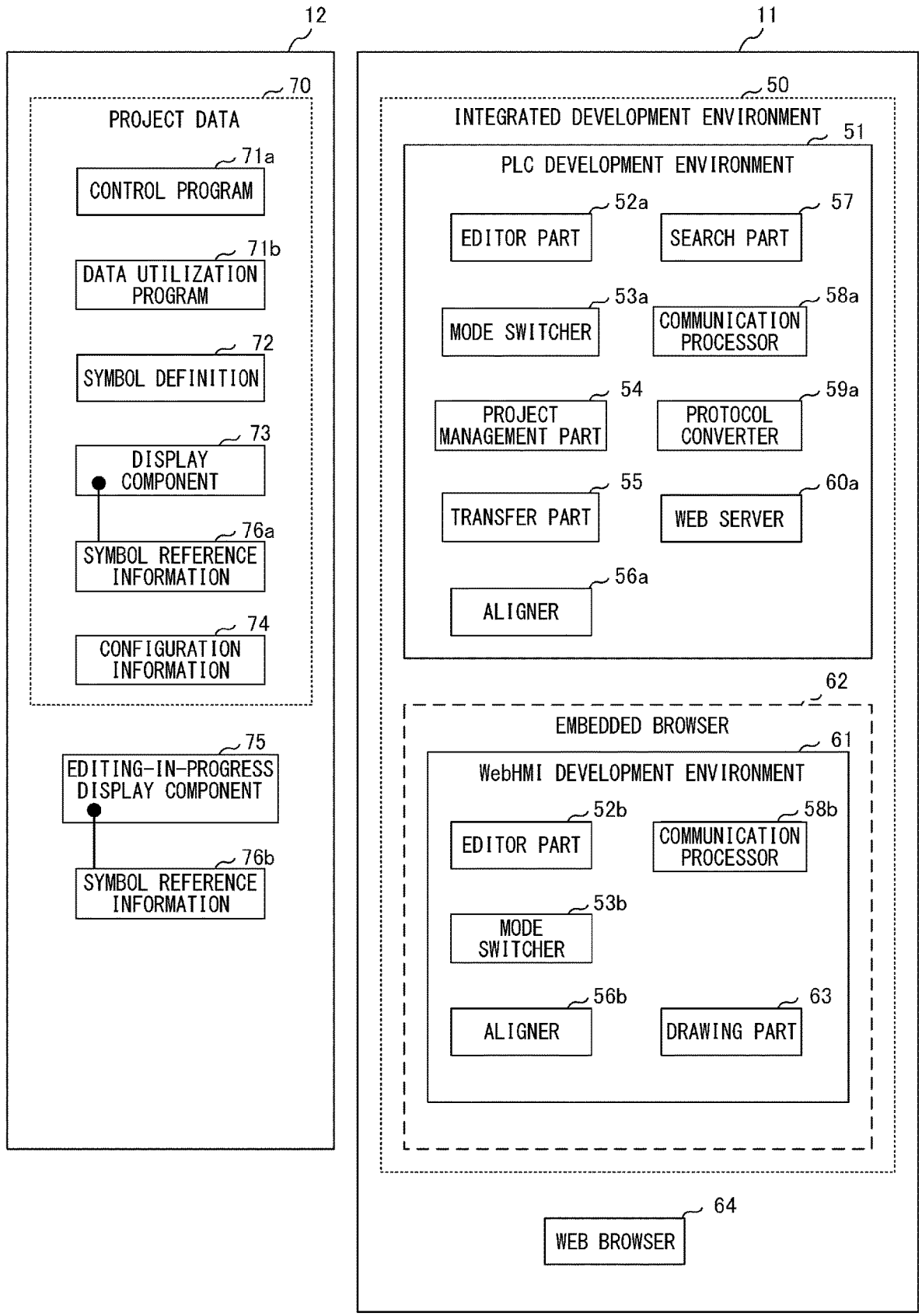
FIG. 4 illustrates functions implemented by a CPU of a programming support apparatus.

FIG. 4 is a diagram illustrating functions implemented by the CPU 11b of the PC 2a. The integrated development environment 50 is a function achieved as the CPU 11 executes the integrated development environment program 14a. The integrated development environment 50 includes a PLC development environment 51 and a WebHMI development environment 61. The PLC development environment 51 is achieved as the CPU 11 executes the PC application program 14b. The WebHMI development environment 61 is achieved as the CPU 11 (an embedded browser 62) executes the web application program 14c. The embedded browser 62 has various functions (execution environments for HTML, CSS, and JavaScript®) required to execute the web application program 14b. The web application program 14b is an aggregate of display components which are transmitted from a web server to a web browser and are required to display a web page on the web browser.

The PLC development environment 51 includes an editor part 52a that supports creation of a control program 71a to be executed by the basic unit 3 and the expansion unit 4b, a data utilization program 71b to be executed by the expansion unit 4a, a symbol definition 72, a display component 73 implementing WebHMI, configuration information 74 of the PLC 1, and the like. A mode switcher 53a switches an operation mode (e.g., an editor mode, a monitor mode, an online edit mode, a simulator mode, or a simulator edit mode) of the integrated development environment 50 according to a user instruction from the operation part 8. In particular, the mode switcher 53a manages an operation mode of the PLC development environment 51. The mode switcher 53a switches the operation mode of the PLC development environment 51 based on a user operation, and makes a request for synchronizing the operation mode (mode transition request) with respect to the WebHMI development environment 61. In addition, if receiving a request (mode transition request) for synchronization with an operation mode of the WebHMI development environment 61 from a mode switcher 53b of the WebHMI development environment 61, the mode switcher 53a switches the operation mode of the PLC development environment 51 according to this request. As a result, the operation mode of the PLC development environment 51 and the operation mode of the WebHMI development environment 61 are synchronized. The editor mode is a mode of editing the project data 70 of the PLC 1 without connecting the PC 2a to the PLC 1. The monitor mode is a mode in which a state of the PLC 1 can be monitored in real time with the PC 2a connected to the PLC 1. The online edit mode is a mode in which a state of the PLC 1 can be monitored in real time with the PC 2a connected to the PLC 1, the project data 70 can be edited and updated, and the updated project data 70 can be transferred to the PLC 1. The simulator mode is a mode in which the WebHMI operation by the control program 71a, the data utilization program 71b, and the display component 73 can be simulated without connecting the PC 2a to the PLC 1. The simulator edit mode is a mode in which the project data 70 can be edited while simulating the WebHMI operation by the control program 71a, the data utilization program 71b, and the display component 73. A project management part 54 saves the project data 70 edited by the editor part 52a or the like in the storage apparatus 12, exports the project data 70 from the storage apparatus 12, or imports the project data 70. There is a case where a plurality of the PLCs 1 having the same or similar configurations are operated in a plurality of manufacturing lines set up in a factory that manufactures products. The export and import are used to divert the project data 70 among the plurality of PLCs 1. A transfer part 55 transfers the project data 70 to the PLC 1 according to a user instruction input through the operation part 8. An aligner 56a and an aligner 56b of the WebHMI development environment 61 communicate with each other through the web server 60a and a communication processor 58b of the WebHMI development environment 61, thereby cooperating with each other regarding a process of editing the project data 70. In the following, the PLC development environment 51 and the WebHMI development environment 61 communicate with each other through the web server 60a and the communication processor 58b. A communication interface of the web server 60a and the communication processor 58b is a Web API (web application programming interface). The aligner 56b transmits a character or a part of a word input by an editor part 52b to the aligner 56a. At this time, the aligner 56b may transmit, to the aligner 56a, a request for acquisition of candidates of a word that needs to be input, and may transmit the input character or part of the word to transmit the request for acquisition of candidates of the word that needs to be input. The aligner 56a searches the symbol definition 72 by a search part 57 regarding the received part of the word, and transmits, to the aligner 56b, the candidates of the word that needs to be input. The aligner 56b passes the candidates of the word to the editor part 52b, and the editor part 52b displays a list of the candidates of the word. The search part 57 executes a search request and a replacement request for a character string from the editor parts 52a and 52b. The integrated development environment 50 is provided with the single search part 57, and this search part 57 is shared by the PLC development environment 51 and the WebHMI development environment 61. The communication processor 58a is a function of communicating with the PLC 1 via the communication part 13, and transmits and receives a communication frame according to a predetermined communication protocol. A protocol converter 59a converts information passed from the web server 60a into a communication frame according to the communication protocol of the communication processor 58a, or converts the communication frame passed from the communication processor 58a and transfers the communication frame to the web server 60a. In this manner, the protocol converter 59a executes encapsulation and decapsulation of information. In a case where the web server of the expansion unit 4a of the PLC 1 provides WebHMI, the web browser 64 accesses the web server of the PLC 1 via the communication part 13. For example, the web browser 64 communicates with the web server of the expansion unit 4*a* via the communication cable 9*b* that connects the communication part 13 and the communication part 43. The web browser 64 accesses the web server of the PLC 1 to acquire the display component 73 of the WebHMI, draws the WebHMI according to the display component 73, and displays the WebHMI on the display part 7. Note that the web browser 64 may be provided on the PC 2*b*. The embedded browser 62 embedded in the integrated development environment 50 accesses the web server 60*a*. For example, the embedded browser 62 accesses the web server 60*a* via the communication processor 58*b*. The web server 60*a* accesses the web server of the PLC 1 via the protocol converter 59*a* and the communication processor 58*a*, acquires the display component 73 of the WebHMI, and passes the display component 73 to the embedded browser 62. For example, the web server 60*a* communicates with the web server of the PLC 1 via the communication cable 9*a* that connects the communication part 13 and the communication part 33. The embedded browser 62 draws the WebHMI according to the display component 73 and displays the WebHMI on the display part 7. The display component 73 has reference information 76*a* of a symbol. The reference information 76*a* of the symbol holds identification information or the like of the symbol to be displayed on the display component 73.

In the WebHMI development environment 61, the editor part 52*b* edits the display component 73 of the WebHMI according to a user instruction input from the operation part 8. Note that the editor part 52*b* holds an editing-in-progress display component 75, which is data being edited of the display component 73, in the storage apparatus 12. When the editor part 52*b* completes the editing related to the WebHMI, the aligner 56*b* uploads the editing-in-progress display component 75 via the communication processor 58*b* and the web server 60*a*. The web server 60*a* passes the editing-in-progress display component 75 and a saving request to the aligner 56*a*, and the aligner 56*a* passes these to the project management part 54. The project management part 54 writes the editing-in-progress display component 75 as the display component 73 in the project data 70 according to the saving request. The editing-in-progress display component 75 also has reference information 76*b* of a symbol. The aligner 56*b* executes operation mode switching and editing processing (search processing, replacement processing, input assistance processing, and input inspection processing) in cooperation with the aligner 56*a*. The mode switcher 53*b* manages the operation mode of the WebHMI development environment 61. The mode switcher 53*b* switches the operation mode of the WebHMI development environment 61 based on a user operation, and requests the PLC development environment 51 to synchronize the operation mode through the aligner 56*b* (makes a mode transition request). In addition, if receiving the request (mode transition request) for synchronization with the operation mode of the PLC development environment 51 from the mode switcher 53*a* via the aligners 56*a* and 56*b*, the mode switcher 53*b* switches the operation mode of the WebHMI development environment 61 according to this request. As a result, the operation mode of the PLC development environment 51 and the operation mode of the WebHMI development environment 61 are synchronized. The communication processor 58*b* communicates with the web server 60*a*. A drawing part 63 draws a web page according to the web application program 14*c* including markup data describing a structure of a front end, style sheet data describing a decoration, and a code describing dynamic processing, for example, codes of HTML, CSS, and JavaScript®, and displays the web page on the display part 7.

Here, the WebHMI development environment 61 is achieved as the embedded browser 62 executes the web application program 14*c*, but this is merely an example. The WebHMI development environment 61 may be achieved by accessing the expansion unit 4*a* from the web browser 64 of the PC 2*b* so as to execute the web application program 14*c* saved in the memory 42*a* of the expansion unit 4*a* on the web browser 64.

Figure 5:
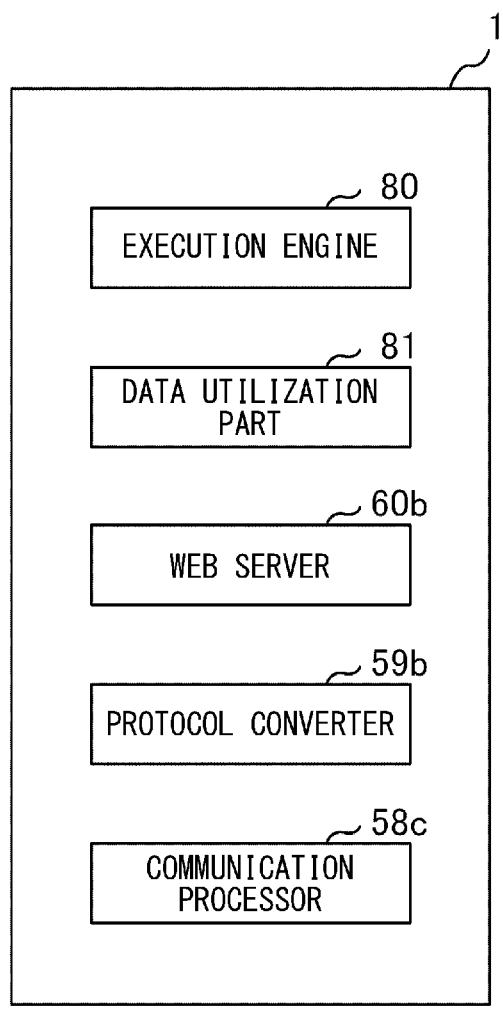
FIG. 5 illustrates functions implemented by a CPU of the PLC.

FIG. 5 illustrates functions implemented by the PLC 1. An execution engine 80 is the CPU 31, the CPU 41, or the like, and executes the control program 71*a*. A data utilization part 81 is implemented as the CPU 31 or the CPU 41 executes the data utilization program 71*b*. The data utilization part 81 collects symbol values, statistically processes the symbol values, and generates an analysis result of the symbol values. A web server 60*b* is implemented as the CPU 31 or the CPU 41 executes a web server program. A communication processor 58*c* is a function of communicating with the PC 2*a* via the communication part 33, and transmits and receives a communication frame according to a predetermined communication protocol. A protocol converter 59*b* converts information passed from the web server 60*b* into a communication frame according to the communication protocol of the communication processor 58*c*, or converts the communication frame passed from the communication processor 58*c* and transfers the communication frame to the web server 60*b*. In this manner, the protocol converter 59*b* executes encapsulation and decapsulation of information. The web server 60*b* provides the display component 73 included in the project data 70 to a web browser to implement WebHMI on the web browser.

Communication Sequence in Editor Mode

In the editor mode, the PLC development environment 51 and the WebHMI development environment 61 communicate with each other as follows.

Figure 6:
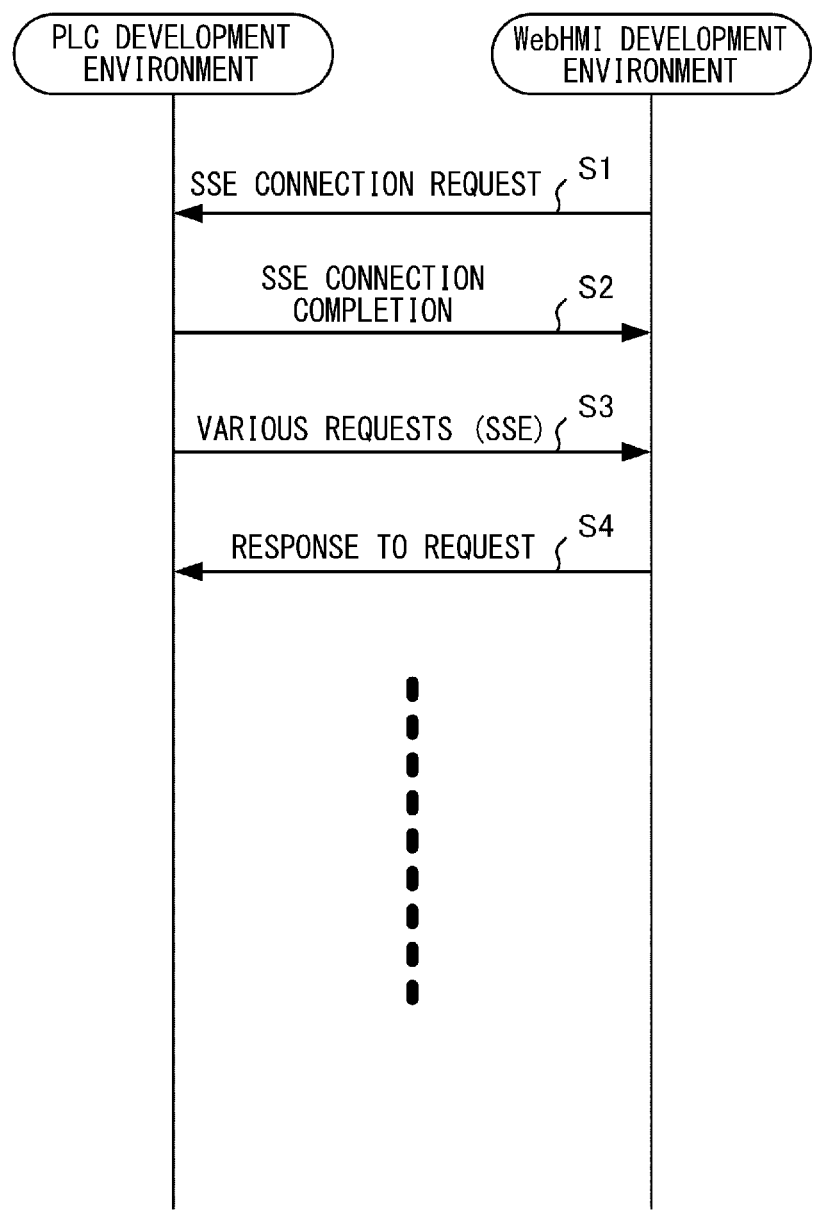
FIG. 6 is a sequence diagram illustrating communication executed between a PLC development environment and a WebHMI development environment.

FIG. 6 illustrates an example in which the PLC development environment 51 transmits a request for cooperation to the WebHMI development environment 61. The PLC development environment 51 is the server side, and thus, executes push communication using Server Sent Events (SSE).

In S1, the aligner 56*b* of the WebHMI development environment 61 transmits an SSE connection request to the web server 60*a* of the PLC development environment 51 via the communication processor 58*b*. The web server 60*a* receives the SSE connection request.

In S2, the web server 60*a* transmits a message indicating the completion of the SSE connection. The aligner 56*b* receives this message via the communication processor 58*b*. As a result, the aligner 56*a* can transmit the request for cooperation to the WebHMI development environment 61 at any timing via the web server 60*a*.

In S3, the aligner 56*a* transmits various requests using SSE through the web server 60*a*. The aligner 56*b* receives the various requests through the communication processor 58*b*. Here, the various requests include, for example, a request for switching an operation mode, a request for switching a web page being displayed by the WebHMI development environment 61, a request for acquiring an operation state of the WebHMI development environment 61, a request for uploading the editing-in-progress display component 75 to the web server 60*a*, a request for displaying a message (for example, a dialog) on a user interface (UI) of the WebHMI development environment 61, a request for new creation of a page or a window, a request for acquiring information indicating a page, a UI operation prohibition request, a UI operation prohibition release request, a comment set/language switching request, and the like.

In S4, the aligner 56b creates a response to the request and transmits the response to the web server 60a via the communication processor 58b. The web server 60a receives the response and passes the response to the aligner 56a. The aligner 56a executes processing according to a content of the response. Then, S3 and S4 are executed repeatedly.

Figure 7:
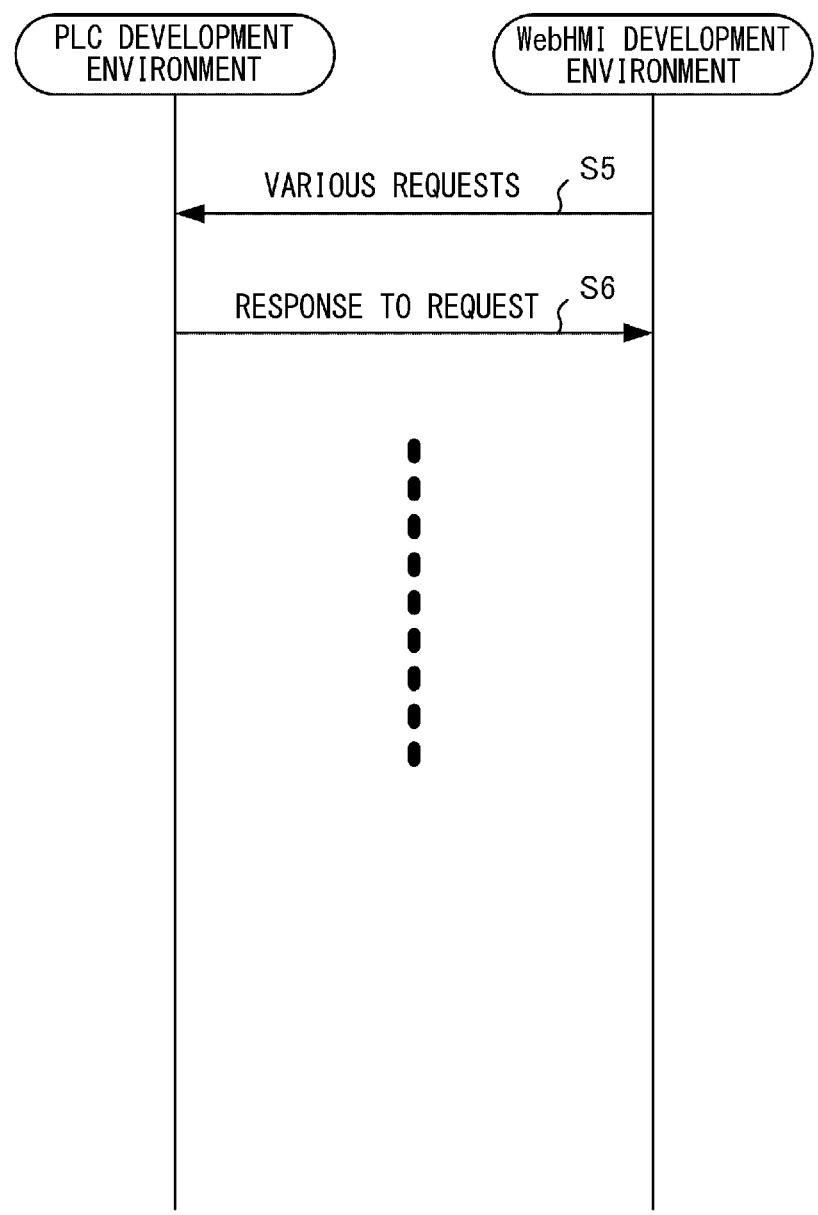
FIG. 7 is a sequence diagram illustrating the communication executed between the PLC development environment and the WebHMI development environment.

FIG. 7 illustrates an example in which the WebHMI development environment 61 transmits a request for cooperation to the PLC development environment 51. Note that the WebHMI development environment 61 is the browser side, that is, a web client, and thus, can freely transmit a request to the PLC development environment 51.

In S5, the aligner 56b of the WebHMI development environment 61 transmits various requests to the web server 60a via the communication processor 58b. The web server 60a transfers the request to the aligner 56a. The aligner 56a creates a response to the request and passes the response to the web server 60a.

In S6, the web server 60a transmits the response to the request to the WebHMI development environment 61. The aligner 56b receives the response via the communication processor 58b.

Here, the requests transmitted from the WebHMI development environment 61 to the PLC development environment 51 include an operation mode switching request, a request for starting an editing function (e.g., a search dialog and a replacement dialog) or the like in the PLC development environment 51, a request for displaying a dialog in the PLC development environment 51, a request for acquiring a list of input character string candidates, a request for acquiring setting information managed by the PLC development environment 51, a request for updating setting information, a request for obtaining parsing (input error check) of an input character string, and the like.

Flowchart

Figure 8:
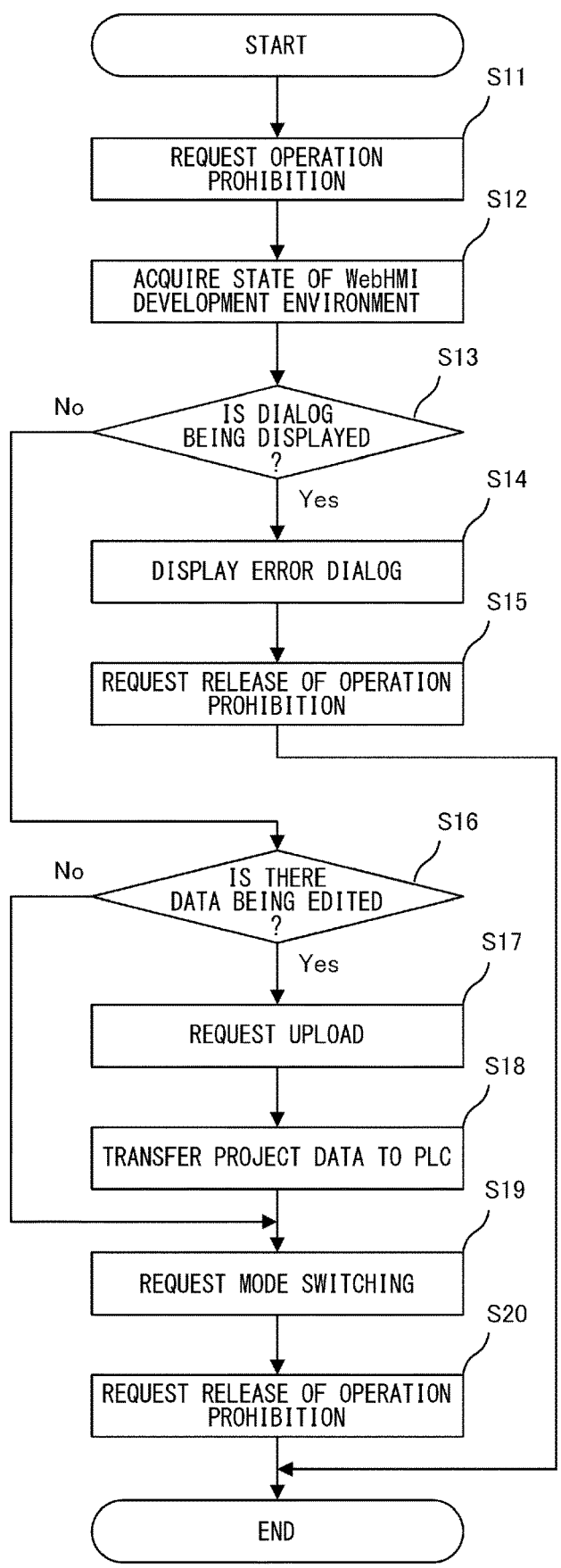
FIG. 8 is a flowchart illustrating an operation mode switching method.

FIG. 8 illustrates a method of requesting mode switching from the PLC development environment 51 to the WebHMI development environment 61. Specifically, a method of requesting switching from the editor mode to the monitor mode is illustrated. Here, it is assumed that a mode switching button provided in a UI of the PLC development environment 51 has been pressed by the user. In addition, it is assumed that the above-described SSE can be used to transmit a request from the PLC development environment 51 to the WebHMI development environment 61.

In S11, the CPU 11 (PLC development environment 51) requests the WebHMI development environment 61 to prohibit the operation. Here, the operation prohibition request is transmitted using SSE. When receiving the operation prohibition request, the WebHMI development environment 61 transitions to an operation prohibition state.

In S12, the CPU 11 (PLC development environment 51) acquires a state of the WebHMI development environment 61 from the WebHMI development environment 61. The WebHMI development environment 61 transmits state information indicating its own state as a response to the PLC development environment 51.

In S13, the CPU 11 (PLC development environment 51) determines whether the state of the WebHMI development environment 61 received as the response from the WebHMI development environment 61 is "displaying a dialog". That is, the CPU 11 (PLC development environment 51) determines whether or not a dialog is being displayed in the state of the WebHMI development environment 61 based on the state information indicating the state of the WebHMI development environment 61. If the dialog is being displayed, the CPU 11 proceeds to S14. If no dialog is being displayed, the CPU 11 proceeds to S16.

In S14, the CPU 11 (PLC development environment 51) displays an error dialog on the display part 7. The error dialog includes a message indicating that it is difficult to execute the mode switching because a dialog is being displayed in the WebHMI development environment 61.

In S15, the CPU 11 (PLC development environment 51) requests the WebHMI development environment 61 to release the operation prohibition. For example, the operation prohibition release request is transmitted using SSE. The WebHMI development environment 61 releases the operation prohibition according to the operation prohibition release request, and transmits a response indicating the completion of the release. As a result, this method ends.

In S16, the CPU 11 (PLC development environment 51) determines whether there is data being edited in the WebHMI development environment 61. The PLC development environment 51 (aligner 56a) requests the WebHMI development environment 61 to answer the presence or absence of data being edited. The WebHMI development environment 61 (aligner 56b) transmits a response indicating the presence or absence of data being edited to the PLC development environment 51. As a result, the aligner 56a determines whether or not there is data being edited in the WebHMI development environment 61. If there is data being edited, the CPU 11 proceeds to S17. If there is no data being edited, the CPU 11 proceeds to S19.

In S17, the CPU 11 (PLC development environment 51) requests the WebHMI development environment 61 to upload the data being edited. The aligner 56 of the WebHMI development environment 61 uploads the data being edited (e.g., the editing-in-progress display component 75) to the PLC development environment 51. The project management part 54 of the PLC development environment 51 saves the editing-in-progress display component 75 in the project data 70.

In S18, the CPU 11 (PLC development environment 51) transfers the project data 70 to the PLC 1.

In S19, the CPU 11 (the mode switcher 53a of the PLC development environment 51) switches an operation mode of the PLC development environment 51 according to a user instruction. As described above, the mode switcher 53a requests the mode switcher 53b of the WebHMI development environment 61 to switch the mode via the aligners 56a and 56b. The mode switcher 53b switches the operation mode of the WebHMI development environment 61 according to the mode switching request. The mode switcher 53b transmits a response indicating the completion of the mode switching to the mode switcher 53a via the aligners 56a and 56b.

In S20, the CPU 11 (PLC development environment 51) requests the WebHMI development environment 61 to release the operation prohibition. The aligner 56b releases the operation prohibition according to the release request, and transmits a response indicating the completion of the release to the WebHMI development environment 61.

Figure 9:
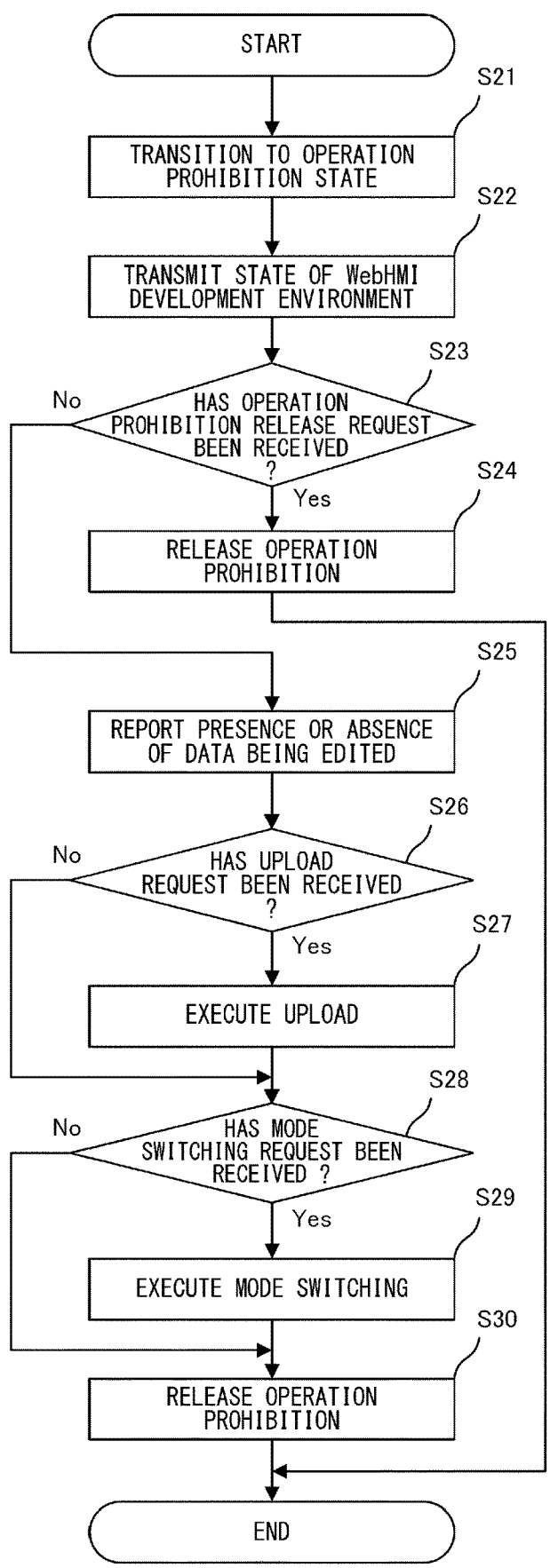
FIG. 9 is a flowchart illustrating the operation mode switching method.

FIG. 9 illustrates a method that is executed in the WebHMI development environment 61 out of the method of requesting mode switching from the PLC development environment 51 to the WebHMI development environment 61.

In S21, the CPU 11 (the aligner 56b of the WebHMI development environment 61) transitions to an operation prohibition state according to the operation prohibition request. When the transition to the operation prohibition state is completed, the CPU 11 transmits a response indicating the completion to the PLC development environment 51.

In S22, the CPU 11 (aligner 56*b*) transmits state information indicating a state of the WebHMI development environment 61 to PLC development environment 51. The aligner 56*b* transmits the state information as a response to a state acquisition request.

In S23, the CPU 11 (aligner 56*b*) determines whether or not an operation prohibition release request has been received. The operation prohibition release request is received when the WebHMI development environment 61 is in a state where the operation mode is not switchable. When the operation prohibition release request has been received, the CPU 11 proceeds to S24. When the operation prohibition release request has not been received, the CPU 11 proceeds to S25.

In S24, the CPU 11 (aligner 56*b*) releases the operation prohibition. The aligner 56*b* transmits a response indicating that the release of the operation prohibition has been completed to the PLC development environment 51.

In S25, the CPU 11 (aligner 56*b*) reports the presence or absence of data being edited to the PLC development environment 51. When receiving a presence/absence inquiry request from the PLC development environment 51, the aligner 56*b* transmits a response indicating the presence or absence to the PLC development environment 51.

In S26, the CPU 11 (aligner 56*b*) determines whether or not an upload request for the data being edited has been received. When the upload request for the data being edited has been received, the CPU 11 proceeds to S27. When the upload request for the data being edited has not been received, the CPU 11 proceeds to S28.

In S27, the CPU 11 (aligner 56*b*) uploads the data being edited (e.g., editing-in-progress display component 75) to the PLC development environment 51.

In S28, the CPU 11 (aligner 56*b*) determines whether or not a mode switching request has been received from the PLC development environment 51. When the mode switching request has been received, the aligner 56*b* passes the mode switching request to the mode switcher 53*b*. Thereafter, the CPU 11 proceeds to S29. When the mode switching request has not been received, the CPU 11 proceeds to S30.

In S29, the CPU 11 (mode switcher 53*b*) switches an operation mode according to the mode switching request. The mode switcher 53*b* transmits a response indicating that the operation mode switching has been completed to the PLC development environment 51 through the aligner 56*b*. This response is transferred to the mode switcher 53*a* via the aligner 56*a*.

In S30, the CPU 11 (aligner 56*b*) releases the operation prohibition. The aligner 56*b* releases the operation prohibition state according to the operation prohibition release request, and transmits a response indicating the completion of the release to the PLC development environment 51.

Figure 10:
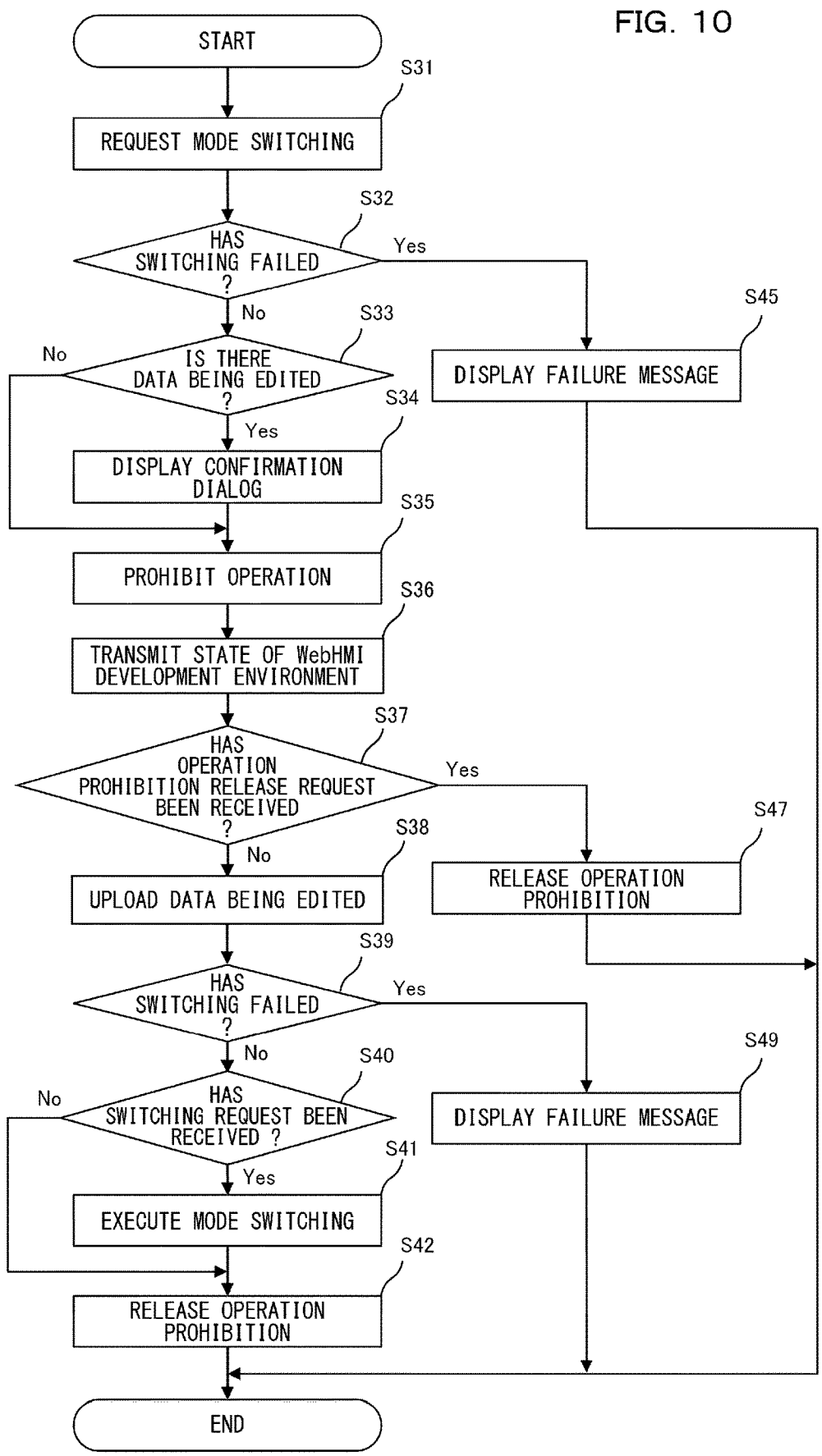
FIG. 10 is a flowchart illustrating the operation mode switching method.

FIG. 10 illustrates a method of requesting mode switching from the WebHMI development environment 61 to the PLC development environment 51. Here, it is assumed that a mode switching button provided in a UI of the WebHMI development environment 61 has been pressed by the user.

In S31, the CPU 11 (mode switcher 53*b*) request the PLC development environment 51 to switch a mode via the aligner 56*b*. Here, the aligner 56*a* of the PLC development environment 51 determines whether or not the PLC development environment 51 is in a busy state. When the PLC development environment 51 is in a busy state, it is difficult to execute the mode switching, and thus, the aligner 56*a* transmits a response indicating a mode switching failure to the WebHMI development environment 61.

In S32, the CPU 11 (aligner 56*b*) determines whether the mode switching has failed in the PLC development environment 51 based on the response from the PLC development environment 51. If the switching has failed, the CPU 11 proceeds to S45 and displays a failure message on the display part 7. If the switching has not failed, the CPU 11 proceeds to S33.

In S33, the CPU 11 (aligner 56*b*) determines whether or not there is data being edited (e.g., the editing-in-progress display component 75). If there is data being edited, the CPU 11 proceeds to S34. If there is no data being edited, the CPU 11 proceeds to S35.

In S34, the CPU 11 (aligner 56*b*) displays a confirmation dialog on display part 7. The confirmation dialog includes, for example, a message indicating that the project data 70 including the editing-in-progress display component 75 is to be transferred to the PLC 1.

In S35, the CPU 11 (aligner 56*b*) prohibits the user's operation on the WebHMI development environment 61.

In S36, the CPU 11 (aligner 56*b*) transmits state information indicating an operating state of the WebHMI development environment 61 to PLC development environment 51.

In S37, the CPU 11 (aligner 56*b*) determines whether or not an operation prohibition release request has been received. When the release request has been received, the CPU 11 proceeds to S47 and releases the operation prohibition. On the other hand, when the release request has not been received, the CPU 11 proceeds to S38.

In S38, the CPU 11 (aligner 56*b*) uploads the data being edited (e.g., editing-in-progress display component 75) to the PLC development environment 51.

In S39, the CPU 11 (aligner 56*b*) determines whether or not the operation mode switching has failed in the PLC development environment 51 based on the information received from the PLC development environment 51 (e.g., mode switching failure notification). When the operation mode switching has failed in the PLC development environment 51, the CPU 11 proceeds to S49 and displays the failure message on the display part 7. The aligner 56*b* transmits a response indicating that the confirmation of the mode switching failure has been completed to the PLC development environment 51. On the other hand, when the switching of the operation mode of the CPU 11 (aligner 56*b*) has not failed in the PLC development environment 51, the CPU 11 proceeds to S40.

In S40, the CPU 11 (aligner 56*b*) determines whether or not a mode switching request has been received from the PLC development environment 51. When the mode switching request has been received from the PLC development environment 51, the CPU 11 proceeds to S41. The aligner 56*b* transfers the mode switching request to the mode switcher 53*b*. When the mode switching request has not been received from the PLC development environment 51, the CPU 11 proceeds to S42.

In S41, the CPU 11 (mode switcher 53*b*) switches the operation mode of the WebHMI development environment 61 according to the mode switching request. Here, the received mode switching request functions as a permission signal for the mode switching request transmitted in S31. When the mode switching is completed, the mode switcher 53*b* transmits a response indicating the completion to the PLC development environment 51 via the aligner 56*b*.

In S42, the CPU 11 (aligner 56b) releases the operation prohibition of the WebHMI development environment 61. When the release is completed, the aligner 56b transmits a response indicating the release completion to the PLC development environment 51.

Figure 11:
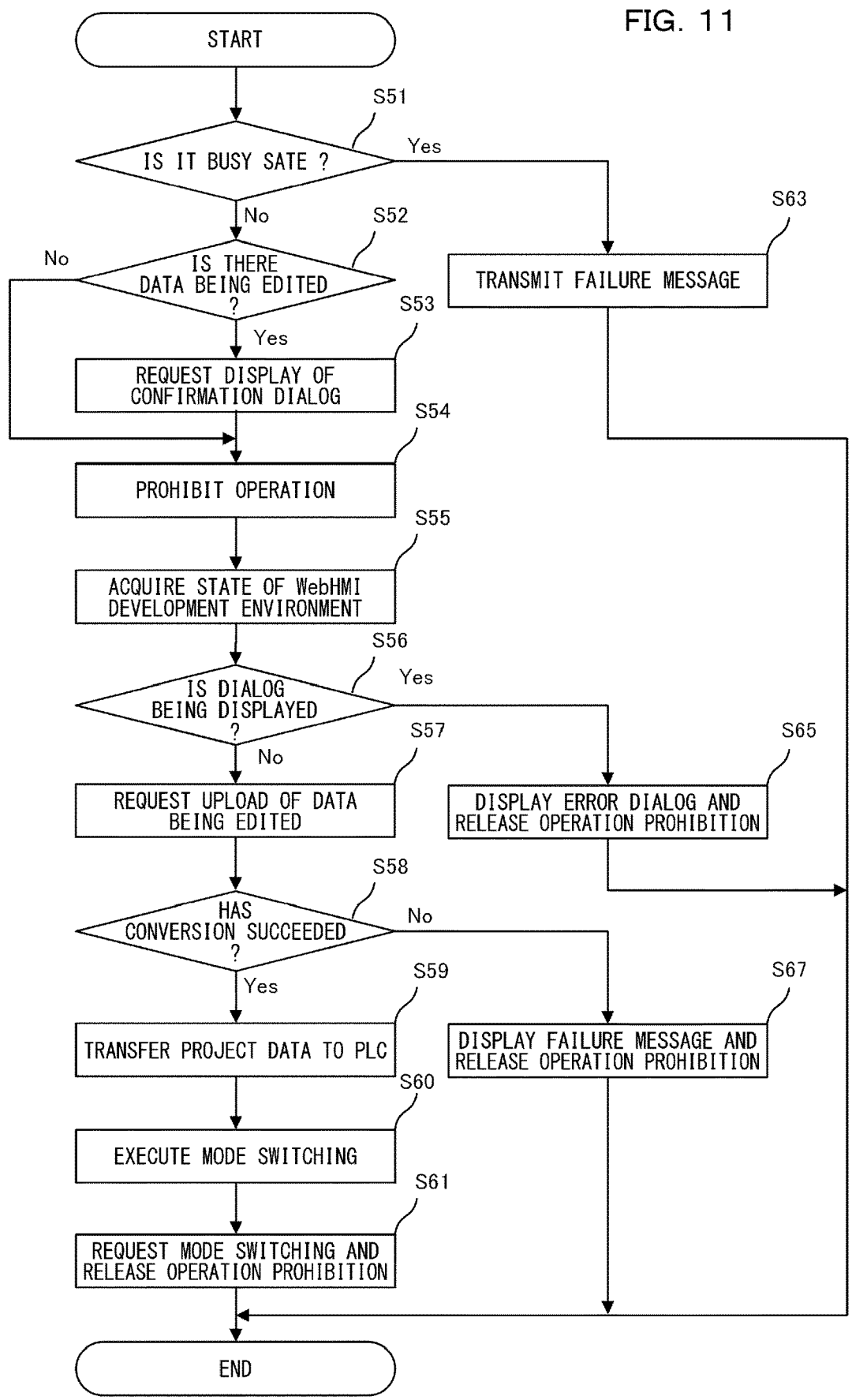
FIG. 11 is a flowchart illustrating the operation mode switching method.

FIG. 11 illustrates a method that is executed in the PLC development environment 51 out of the method of requesting mode switching from the WebHMI development environment 61 to the PLC development environment 51.

In S51, the CPU 11 (aligner 56a) determines whether the state of the PLC development environment 51 is in a busy state. For example, when a modal window of the PLC development environment 51 is open, the state of the PLC development environment 51 is determined as the busy state. If the state of the PLC development environment 51 is the busy state, the CPU 11 proceeds to S63 and transmits the failure message indicating that the mode switching has failed to the WebHMI development environment 61. The aligner 56b of the WebHMI development environment 61 displays the received failure message on the display part 7 through the drawing part 63. On the other hand, if the state of the PLC development environment 51 is not the busy state, the CPU 11 proceeds to S52.

In S52, the CPU 11 (aligner 56a) determines whether there is data being edited in the PLC development environment 51 or the WebHMI development environment 61. If there is no data being edited, the CPU 11 proceeds to S54. If there is data being edited, the CPU 11 proceeds to S53.

In S53, the CPU 11 (aligner 56a) requests the WebHMI development environment 61 to display a confirmation dialog. This confirmation dialog includes a message indicating that the data being edited needs to be transferred, and thus, the project data 70 needs to be transferred to the PLC 1. The user presses an OK button of the confirmation dialog displayed in the WebHMI development environment 61 by the operation part 8.

In S54, the CPU 11 (aligner 56a) prohibits the operation in the WebHMI development environment 61. As described above, an operation prohibition request is transmitted to the WebHMI development environment 61, and an operation prohibition completion response is received from the WebHMI development environment 61.

In S55, the CPU 11 (aligner 56a) acquires a state of the WebHMI development environment 61. As described above, a state acquisition request is transmitted to the WebHMI development environment 61, and a response including state information is returned.

In S56, the CPU 11 (aligner 56a) determines whether a dialog is being displayed in the WebHMI development environment 61 based on the state information. If the dialog is being displayed, the CPU 11 proceeds to S65 and displays an error dialog in the PLC development environment 51. Furthermore, the CPU 11 transmits an operation prohibition release request to the WebHMI development environment 61 to release the operation prohibition of the WebHMI development environment 61. On the other hand, if no dialog is being displayed, the CPU 11 proceeds to S57.

In S57, the CPU 11 (aligner 56a) transmits an upload request to the WebHMI development environment 61 to request the WebHMI development environment 61 to upload the data being edited. As a result, the WebHMI development environment 61 uploads the data being edited to the PLC development environment 51, and transmits an upload completion response.

In S58, the CPU 11 (editor part 52a) converts partial data that needs to be converted out of the project data 70, and determines whether the conversion has succeeded. A conversion rule used for this conversion is mounted on the editor part 52a, but a converter may be provided outside the editor part 52a. If the conversion fails, the CPU 11 proceeds to S67, displays a failure message, which indicates that the mode switching has failed, in the WebHMI development environment 61, and releases the operation prohibition in the WebHMI development environment 61. For example, the CPU 11 (editor part 52a) transmits an operation prohibition release request to the WebHMI development environment 61. The WebHMI development environment 61 having received the operation prohibition release request releases the operation prohibition. On the other hand, if the conversion has succeeded, the CPU 11 proceeds to S59.

In S59, the CPU 11 (transfer part 55) transfers the project data 70 to the PLC 1.

In S60, the CPU 11 (mode switcher 53a) executes the mode switching. That is, the mode switcher 53a switches the operation mode of the PLC development environment 51 to another operation mode designated by the WebHMI development environment 61. For example, the mode switcher 53a switches the operation mode of the PLC development environment 51 from the editor mode to the monitor mode.

In S61, the CPU 11 (aligner 56a) requests the WebHMI development environment 61 to switch a mode, and releases the operation prohibition of the WebHMI development environment 61. For example, the CPU 11 (aligner 56a) transmits an operation prohibition release request to the WebHMI development environment 61, and the WebHMI development environment 61 releases the operation prohibition according to the received operation prohibition release request. When receiving the mode switching request, the WebHMI development environment 61 executes the mode switching and returns a mode switching completion response. In addition, when the WebHMI development environment 61 receives the operation prohibition release request, the operation prohibition is released and a response indicating the completion of the release is returned.

Monitor Mode

In the monitor mode, the WebHMI development environment 61 receives HTML data, CSS data, and JavaScript® scripts for displaying a UI of WebHMI from the web server 60b of the PLC 1 via the PLC development environment 51, and displays the UI of the WebHMI on the display part 7. As described above, a communication route herein is a route such as the communication processor 58b<=>the web server 60a<=>the protocol converter 59a<=>the communication processor 58a<=>the communication processor 58c<=>the protocol converter 59b<=>the web server 60b. Here, a physical layer interface between the PLC 1 and the PC 2a is Ethernet®, universal serial bus (USB) interface (IF), serial communication IF, or the like. In addition, a communication protocol of a higher layer may be a unique protocol by a manufacturer of the PLC 1. Therefore, the protocol converters 59a and 59b are provided such that TCP transparent communication can be implemented between the web server 60a on the PC 2a side and the web server 60b on the PLC 1 side. Here, the TCP transparent communication emulates Ethernet® in communication via a physical layer different from Ethernet®, and handles TCP transparently. In short, the web server 60a operates so as to pass the communication from the communication processor 58b to the protocol converter 59a. For example, the protocol converter 59a adds a header of the unique protocol to the frame by a Web API received from a web server 60a to encapsulate the frame. Furthermore, the communication processor 58a adds a header such as USB to create a communication frame, and transmits the communication frame to the communication processor 58c. The communication processor 58c removes the header such as USB from the received communication frame and passes the communication frame to the protocol converter 59b. The protocol converter 59b removes the header of the unique protocol and passes the communication frame to the web server 60b. A procedure of communication from the web server 60b to the web server 60a is the reverse procedure.

Since the protocol converters 59a and 59b are provided in this manner, a communication interface between the PC 2a and the PLC 1 is not limited to a wired LAN such as Ethernet® or a wireless LAN. That is, the communication interface between the PC 2a and the PLC 1 may be achieved by a communication circuit such as a USB IF to which an IP address is not assignable.

<Development Assistance Function>

Start of WebHMI Development Environment

Figure 12:
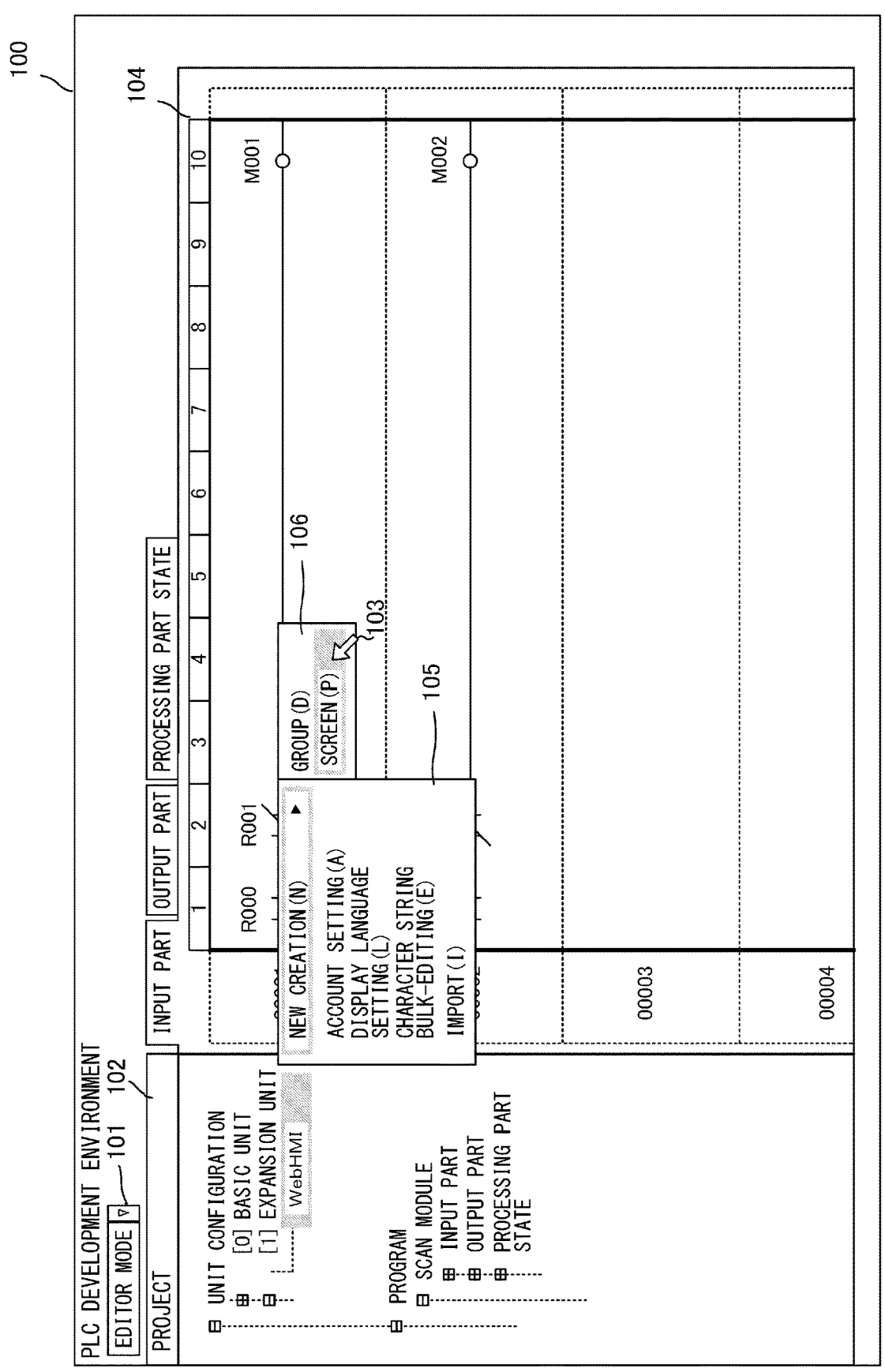
FIG. 12 is a view illustrating a method of starting the WebHMI development environment.

FIG. 12 illustrates a UI 100 of the PLC development environment 51. A mode selection menu 101 displays an operation mode of the integrated development environment 50 in a selectable manner. A program display area 104 displays a ladder program, which is an editing target, to be editable. A project display area 102 displays information constituting a project. This information includes specification information and setting information of the basic unit 3 and the expansion unit 4 constituting the PLC 1, a symbol definition, a data utilization program, a ladder program, and the like.

When the user operates a pointer 103 and selects "WebHMI" from the project display area 102, the PLC development environment 51 displays a menu 105. When the user selects "new creation" from the menu 105, the PLC development environment 51 displays a menu 106. When the user selects "screen" from the menu 106 with the pointer 103, the PLC development environment 51 starts the WebHMI development environment 61.

Figure 13:
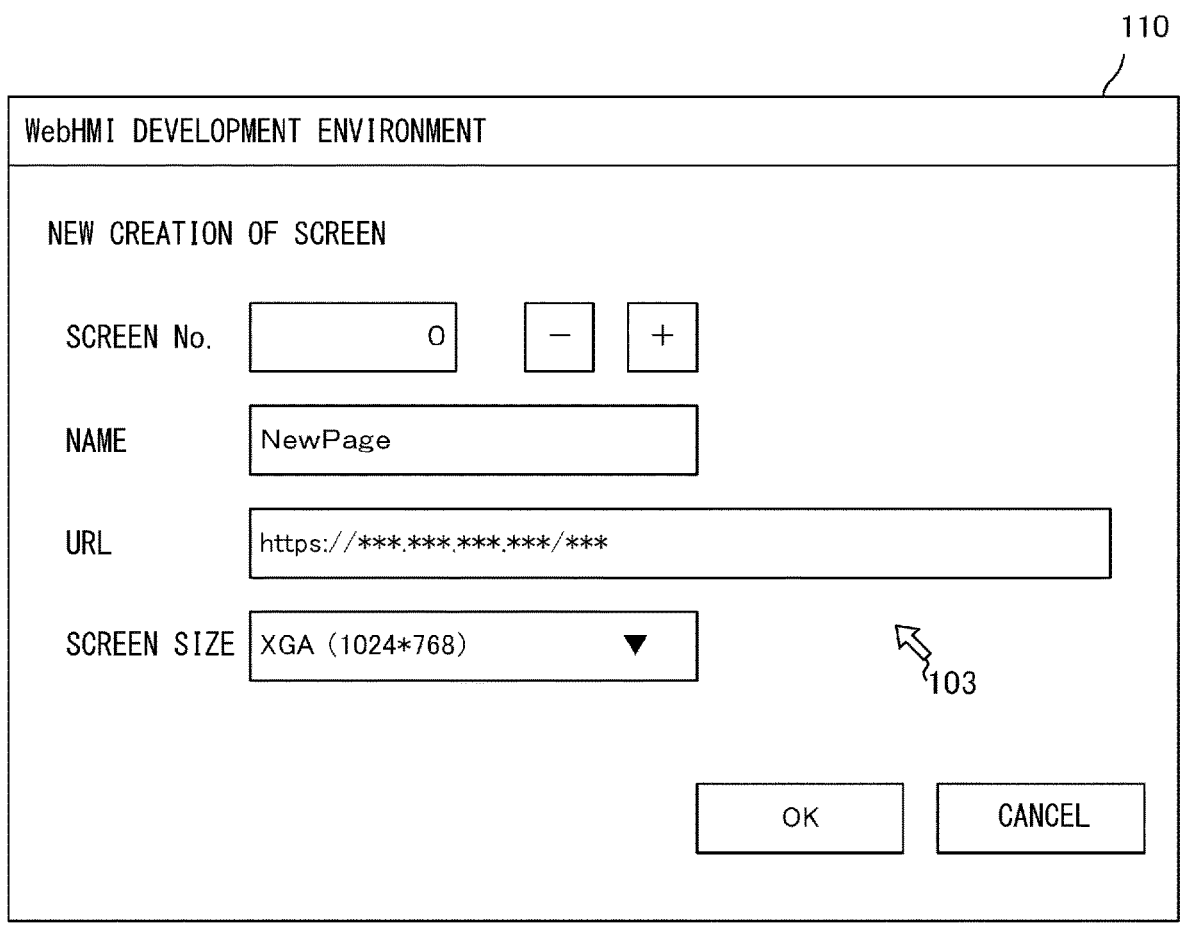
FIG. 13 is a view illustrating a UI of the WebHMI development environment.

FIG. 13 illustrates a UI 110 configured to newly create a screen of the WebHMI development environment 61. The UI 110 is displayed by the embedded browser 62 of the WebHMI development environment 61. The UI 110 receives settings such as an identification number, a name, a URL, and screen size for identifying each screen.

The UI 110 configured to edit a display screen in this manner can be seamlessly started from the UI 100 of the PLC development environment 51 which is a PC application. Therefore, the user can use the PLC development environment 51 and the WebHMI development environment 61 in the integrated development environment 50 without recognizing the PLC development environment 51 and the WebHMI development environment 61 as separate applications.

Meta Information of Symbol

Figure 14:
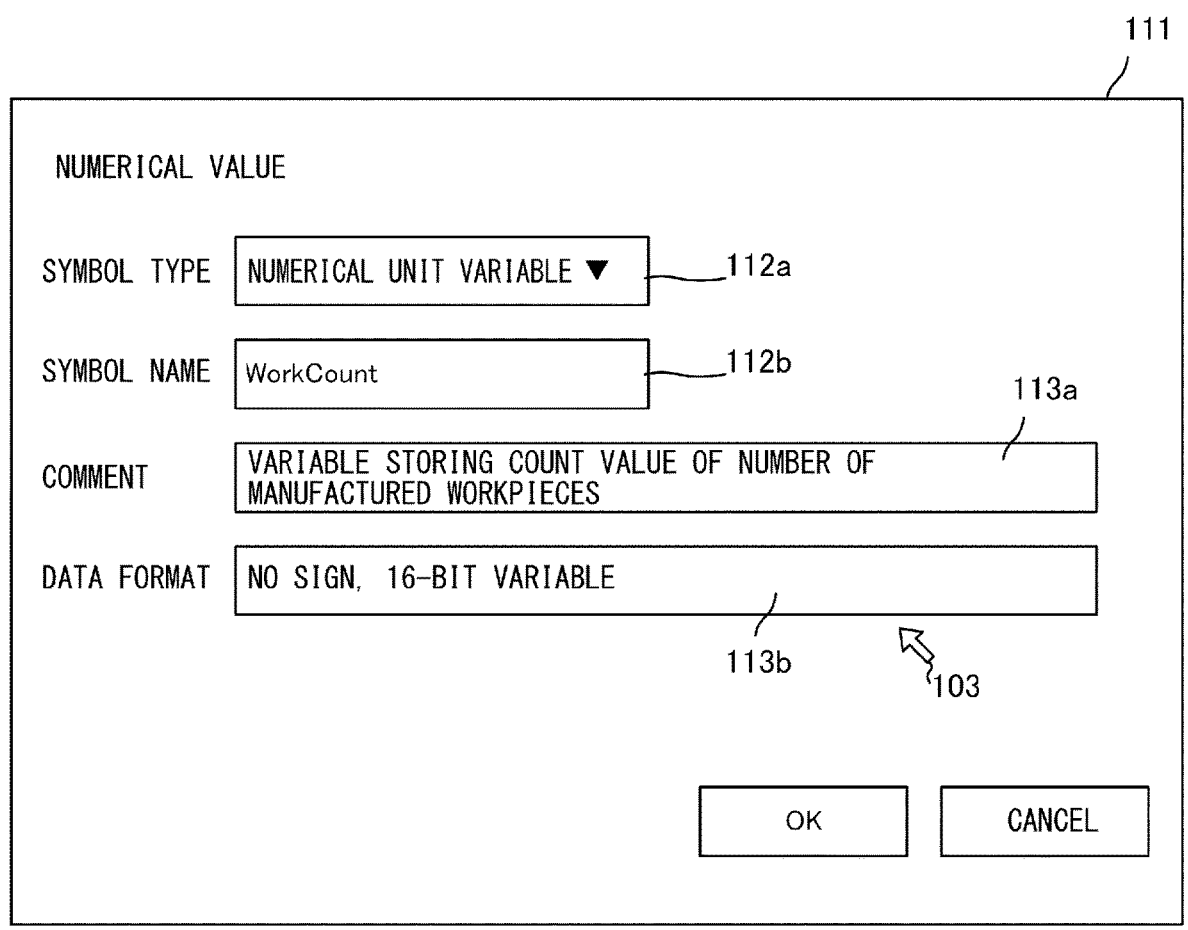
FIG. 14 is a view illustrating a UI of the WebHMI development environment.

FIG. 14 illustrates a setting UI 111 of a reference destination symbol that stores a symbol value and the like to be displayed on a display component in the WebHMI development environment 61. The reference destination symbol is a symbol whose value is referenced by a display component. The setting UI 111 has a symbol type setting part 112a, a symbol name setting part 112b, a comment display area 113a, and a data format display area 113b. The aligner 56b inquires of the aligner 56a of the PLC development environment 51 about a symbol (device or variable) input to the symbol name setting part 112b. The aligner 56a causes the search part 57 to execute a search, extracts meta information such as a comment and a data format corresponding to a symbol name, and transmits the meta information to the aligner 56b via the aligner 56a. The aligner 56b passes the comment and the data format to the drawing part 63, the drawing part 63 displays the comment in the comment display area 113a, and displays the data format in the data format display area 113b.

Since the symbol definition 72 is input and set in the PLC development environment 51, the PLC development environment 51 can display the symbol definition 72. However, the convenience of the user may be reduced if the symbol definition 72 is displayed returning to the PLC development environment 51 at the time of setting the reference destination symbol for the display component in the WebHMI development environment 61. Since the WebHMI development environment 61 can display the symbol definition 72 on the UI 111 in the present embodiment, the user can easily confirm the symbol definition 72 without returning to the PLC development environment 51.

Symbol Input Assistance

Figure 15:
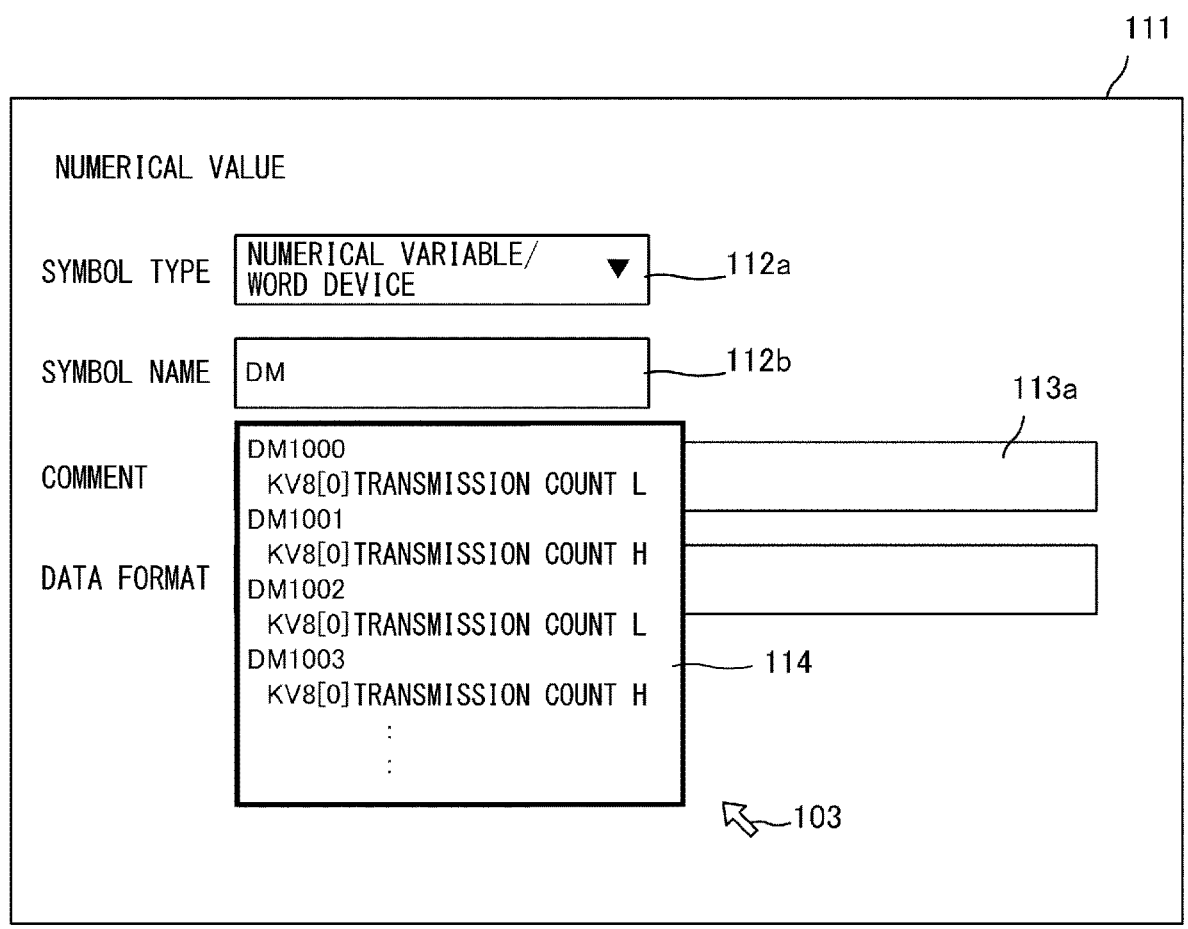
FIG. 15 is a view illustrating a UI of the WebHMI development environment.

FIG. 15 is a diagram illustrating symbol input assistance. As described above, the aligner 56b can search the project data 70 using the search part 57 of the PLC development environment 51 to acquire a search result. FIG. 15 illustrates a candidate selection part 114 that displays search results based on a character string "DM" input to the symbol name setting part 112b and information on a symbol type. When the aligner 56b passes the search result to the drawing part 63, the drawing part 63 displays the candidate selection part 114 that lists the search results. The candidate selection part 114 displays candidates of a device including DM and meta information such as a comment set or defined for the device. When the user selects any candidate from the candidate selection part 114, the editor part 52b inputs the selected candidate to the setting part 112b. The drawing part 63 displays the input candidate in the setting part 112b. Note that such a candidate search and selection function (the search part 57) is mounted on the PLC development environment 51, and the WebHMI development environment 61 uses the function of the PLC development environment 51 through the aligner 56b.

Since the WebHMI development environment 61 can use the functions of the PLC development environment 51 by transmitting a request via the Web API in this manner, it is unnecessary to individually mount the same function on the WebHMI development environment 61 and the PLC development environment 51. In addition, the WebHMI development environment 61 can refer to the symbol definition 72 managed by the PLC development environment 51, and thus, it is unnecessary for the WebHMI development environment 61 to individually create and hold the symbol definition 72. In addition, a plurality of different symbol definitions 72 do not conflict or are not jumbled up.

Search and Replace Functions

Figure 16:
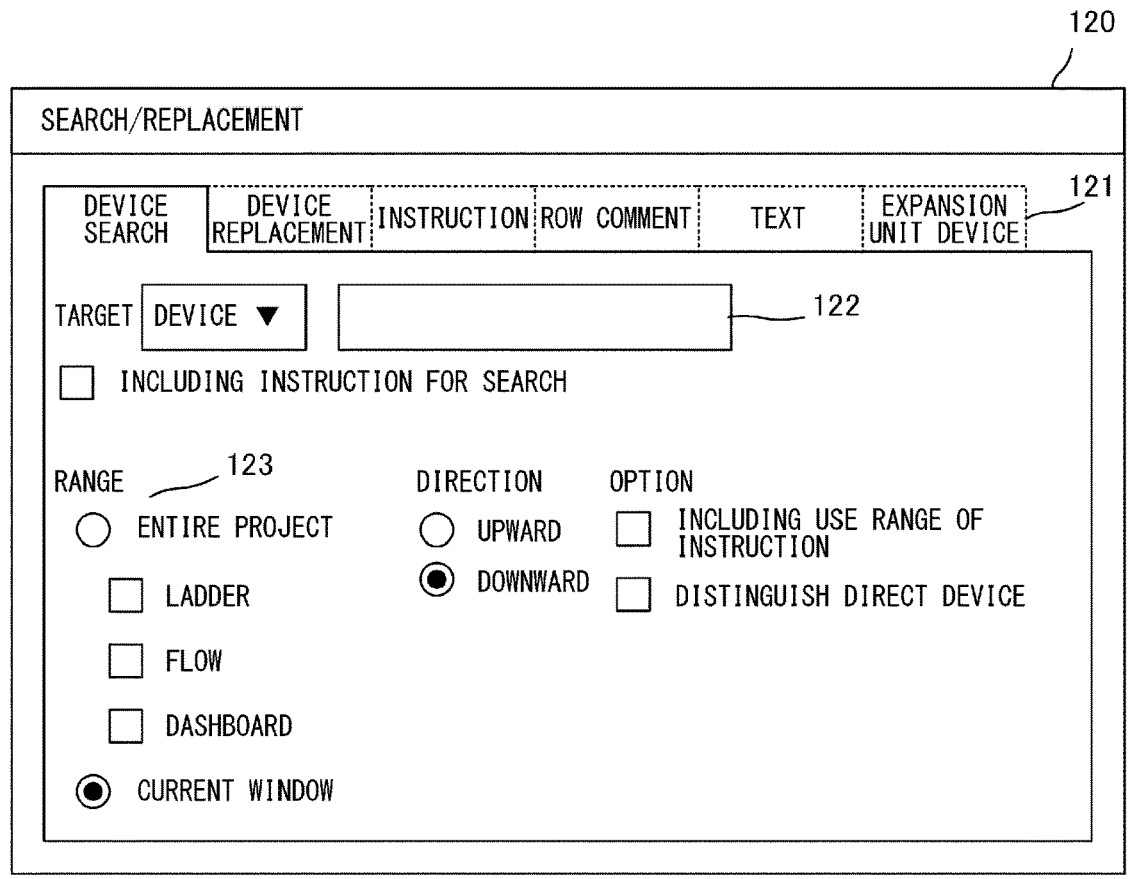
FIG. 16 is a view illustrating a search and replacement function.

FIG. 16 illustrates a dialog 120 of the search part 57. The search part 57 can be called from both the PLC development environment 51 and the WebHMI development environment 61. The search part 57 can perform search and replace throughout the integrated development environment 50. Therefore, the user can perform search and replace across the PLC development environment 51 and the WebHMI development environment 61. The dialog 120 has a plurality of tabs 121 configured to limit a search target. A search target setting part 122 receives an input of a character string serving as the search target. A range setting part 123 receives a setting of a search range. Here, both the entire project and a current window are set as the search range. In this manner, the search part 57 does not always execute the search in the entire integrated development environment 50, but may execute the search limited to the PLC development environment 51 or the WebHMI development environment 61 (that is, the current window) that has called the dialog 120. This may lead to an effect of reducing the time required for the search.

Bulk Switching of Display Language and Comment Set

If a display language setting of one of the PLC development environment 51 and the WebHMI development environment 61 is changed, a display language setting of the other of the PLC development environment 51 and the WebHMI development environment 61 is also changed. When the user instructs the change of the display language setting in the PLC development environment 51, the aligner 56a instructs the aligner 56b to change the display language setting. The aligner 56b changes the display language setting of the WebHMI development environment 61 according to this instruction. On the contrary, when the user instructs the change of the display language setting in the WebHMI development environment 61, the aligner 56b requests the aligner 56a to change the display language setting. The aligner 56a changes the display language setting of the PLC development environment 51 according to this request. A change of a comment set is performed in the similar procedure as the change of the display language.

Detection and Notification of Error of Input Character String

Figure 17:
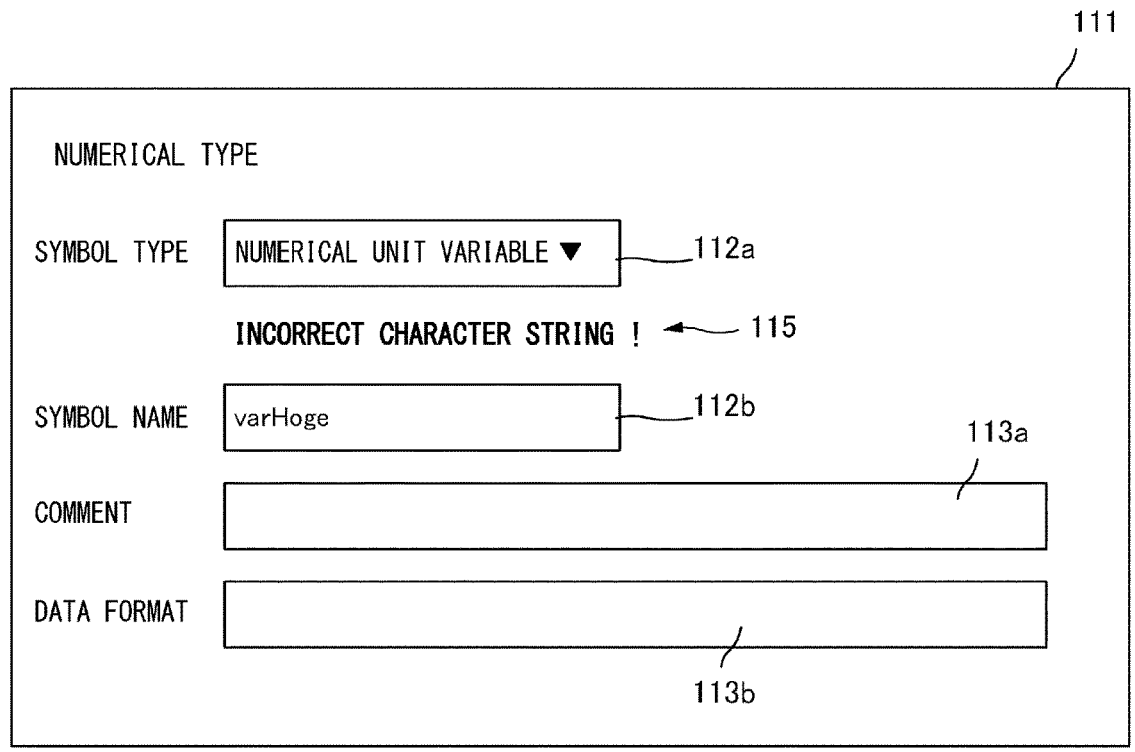
FIG. 17 is a view illustrating an input assistance function.

FIG. 17 is a diagram illustrating detection and notification of an error of a character string input in the WebHMI development environment 61. As described above, the aligner 56b of the WebHMI development environment 61 can acquire a search result of a character string (e.g., varHoge) input to the setting part 112b from the search part 57. When any character string input to the setting part 112b has not been found or when a character string input to the setting part 112b is present but is a symbol in a data format that is not allowed to be designated as a reference source, the search part 57 transmits a response indicating such a fact to the aligner 56b. The aligner 56b may display a warning message 115 according to the response on the UI 111 via the drawing part 63. When an undefined symbol is input in this manner, the warning message 115 is displayed. The drawing part 63 may highlight the setting part 112b instead of displaying the warning message 115. For example, a color of a frame of an input field of the setting part 112b may be changed to a color different from a normal color. As a result, the user may be able to easily notice a typing mistake.

Conversion Check Before Project Transfer

The transfer part 55 transfers the project data 70, which includes both data created by the PLC development environment 51 and data created by the WebHMI development environment 61, to the PLC 1. Here, the transfer part 55 executes inspection of the project data 70. Here, the inspection includes checking the consistency of settings such as symbols in the entire project data 70. Furthermore, the transfer part 55 executes conversion of the display component 73 created in the WebHMI development environment 61 to check whether there is an error in a result of the conversion. When an error is found, the transfer part 55 may request the WebHMI development environment 61 to display an editing screen of the display component 73 causing the error. The drawing part 63 of the WebHMI development environment 61 displays the editing screen of the display component 73 causing the error according to the request. This allows the user to easily resolve the error.

Saving, Opening, Transfer, and Collation of Project

In the present embodiment, the display component 73 created by the WebHMI development environment 61 is saved, opened, transferred, and collated collectively with the control program 71a and the like created by the PLC development environment 51. Therefore, the burden on the user regarding the project management is greatly reduced as compared with a case where a project is managed separately in the PLC development environment 51 and the WebHMI development environment 61.

Note that the transfer part 55 may display a dialog, configured to allow the user to select data to be transferred out of the project data 70, on the display part 7 and receive a selection from the user. Here, in the dialog, data created by the WebHMI development environment 61 and data created by the PLC development environment 51 are displayed as a list of transfer candidates. These pieces of data can be individually selected and displayed by a check box or the like. That is, the user can designate or release the data to be transferred on one selection screen.

Import and Export

Figure 18:
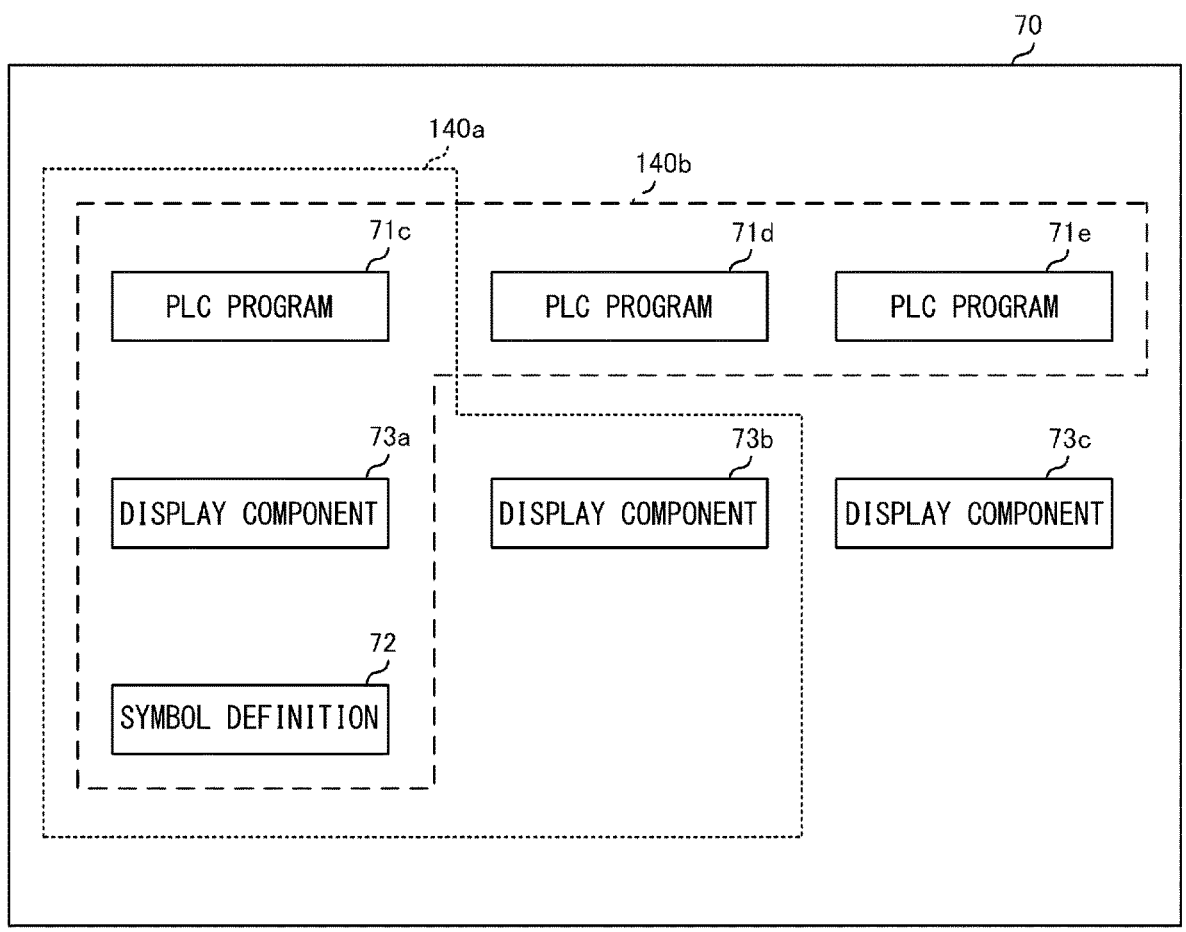
FIG. 18 is a view illustrating import and export of a project.

FIG. 18 is a diagram illustrating the import and export functions of the project data 70. The project management part 54 designates some or all of a plurality of pieces of data constituting the project data 70 and executes import or export. For example, when the export is instructed, the project management part 54 may display a selection screen of data to be exported on the display part 7. In FIG. 18, the project data 70 includes PLC programs 71c, 71d, and 71e, display components 73a, 73b, and 73c, and the symbol definition 72. The project management part 54 creates an export unit 140a so as to include the PLC program 71c, the display components 73a and 73b, and the symbol definition 72 according to a selection from the user. Furthermore, the project management part 54 creates an export unit 140b so as to include the PLC programs 71c, 71d, and 71e, the display component 73a, and the symbol definition 72 according to a selection from the user.

Note that the export units 140a and 140b in FIG. 18 may be understood as import units. That is, the project management part 54 may open the project data 70 to be imported, and set an import unit including a program and a data group to be imported from the project data 70 to another project data.

As a result, the program and the display component 73 related to the PLC 1 can be also used in other projects, which may improve the development efficiency of project data.

Interoperability in Editing Work

There is a case where the same symbol is referenced in the WebHMI development environment 61 and the PLC development environment 51. Furthermore, the referenced symbol is sometimes changed in one environment of the WebHMI development environment 61 and the PLC development environment 51. In this case, if the symbol change in the one environment is automatically reflected in the other environment of the WebHMI development environment 61 and PLC development environment 51, the editing burden on the user may be reduced.

For example, there is a case where a buffer memory of the expansion unit 4a may be set as a reference destination of a certain display component 73 in the WebHMI development environment 61. In general, unique unit numbers are assigned to the plurality of expansion units 4, respectively, and the buffer memory is also associated with the unit number of the expansion unit 4. For example, the buffer memory is identified by the unit number and a buffer memory number. Here, if a configuration of the PLC 1 is changed, unit numbers are reassigned. For example, if the expansion unit 4a is connected next to the basic unit 3, "0" is set as a unit number of the basic unit 3, and "1" is set for the expansion unit 4a. When the expansion unit 4b is additionally connected between the basic unit 3 and the expansion unit 4a, "1" is set as a unit number of the expansion unit 4b, and "2" is set as a unit number of expansion unit 4a. In this manner, the unit number of the expansion unit 4a is changed if the unit configuration of the PLC 1 is changed. Therefore, when a buffer memory (buffer memory number=16) of the expansion unit 4a (unit number=1) is designated as a reference destination of a certain display component, it is necessary to change the reference destination of the certain display component to the buffer memory (buffer memory number=16) of the expansion unit 4a (unit number=2).

The PLC development environment 51 holds the unit number of the basic unit 3 and the unit numbers of the expansion units 4a and 4b in the configuration information 74. In addition, the editor part 52a of the PLC development environment 51 reassigns unit numbers when a connection position of the expansion unit 4a is changed or another expansion unit 4 is added. The search part 57 searches for a symbol associated with a unit number before change, and changes the unit number of the extracted symbol to a changed unit number. In addition, when extracting a symbol for which the display component 73 generated by the WebHMI development environment 61 is associated with a unit number before change, the search part 57 notifies the aligner 56b of the WebHMI development environment 61, through the aligner 56a, of a notification indicating that the unit number has been changed for the extracted symbol. The aligner 56b searches for and extracts a symbol associated with a unit number before change from the reference information 76b of the symbol in the editing-in-progress display component 75, and rewrites the unit number of the extracted symbol to a changed unit number. As a result, the burden on the user is reduced.

Case where Configuration of PLC on Export Side and Configuration of PLC on Import Side are Different There is a case where the PLC 1 on the export side which is to export the project data 70 includes the basic unit 3 and three expansion units 4, and the PLC 1 on the import side into which the project data 70 is to be imported include the basic unit 3 and four expansion units 4. In such a case, the user needs to edit the imported project data 70 appropriately according to the configuration of the PLC 1 on the import side. The project management part 54 may display a dialog for inquiring of the user about a relationship between an expansion unit in the PLC 1 on the export side and an expansion unit in the PLC 1 on the import side on the display part 7.

Figure 19:
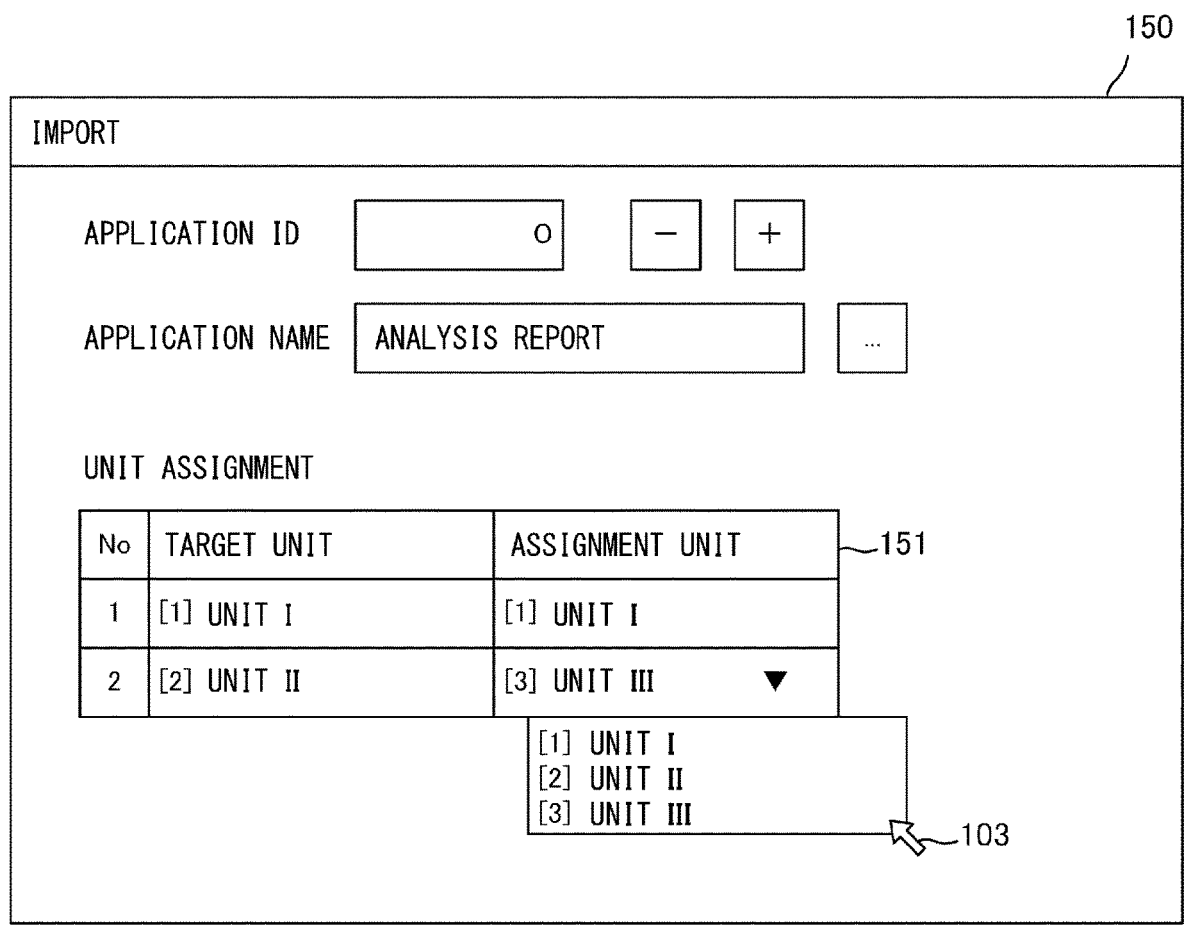
FIG. 19 is a view illustrating an input of a correspondence relationship of a unit configuration accompanying the import.

FIG. 19 illustrates a dialog 150 for unit assignment. The dialog 150 has a unit assignor 151 that receives a designation by the user regarding a correspondence relationship between an expansion unit on the export side and an expansion unit on the import side. In this example, the user has designated that the expansion unit whose unit number is 2 in the PLC 1 on the export side is assigned with a unit number 3 in the PLC 1 on the import side. The project management part 54 searches for the project data 70 to be imported based on the above unit assignment, extracts all symbols associated with the unit number (=2) before change are extracted, and rewrites the extracted symbols to have the changed unit number (=3). At this time, if there is a symbol name based on configuration information other than the unit number, the symbol name is also rewritten. For example, if the WebHMI development environment refers to a relay assigned with a serial number from Unit number 0, symbol names thereof are also changed. In addition, a buffer memory number associated with the symbol is not changed, but a symbol name is changed. For example, if a unit number is changed, a symbol name may be changed from R35000 to R39000. The project management part 54 changes the symbol name based on the change of the unit number.

Case where Display Component with Image Data has been Imported in PLC Development Environment The WebHMI development environment 61 manages image data for a web page that implements WebHMI by adding identification information. Since the image data is saved as an image file, the identification information (e.g., an identification number) is associated with a file name. The above-described import and export functions allow the project management part 54 to take a part of the project data 70 for one the PLC 1 into the project data 70 of the other PLC 1. At this time, there is a case where identification information of image data included in the project data 70 on the export side (source) is already used in the project data 70 of the other PLC 1 on the import side (destination). For example, there is a case where "0" is assigned as an identification number to image data having a file name "AAA.png" in the project data 70 on the export side, and "0" is assigned as an identification number to image data having a file name "BBB.png" in the project data 70 on the import side. That is, the identification numbers overlap.

Therefore, the project management part 54 determines whether or not an identification number assigned to image data in the source project data 70 overlaps with an identification number assigned to image data in the destination project data 70. When overlapping identification numbers are found, the project management part 54 replaces the identification number of the image data of the source project data 70 with an unused identification number in the destination project data 70. Furthermore, the project management part 54 searches for the display component 73 that refers to the identification number before replacement in the source project data 70, and replaces an identification number of the image data in the extracted display component 73 with the unused identification number. As a result, the overlap in the identification information of the image data is automatically avoided, and the burden of changing the identification information by the user is reduced. Here, the identification number is exemplified as the identification information, but the identification information may be any character string such as a file name. In this case as well, the project management part 54 replaces overlapping identification information in a source with unused identification information in a destination. In addition, the image data may be video data as well as a still image. Audio data may be used in place of or in addition to the image data. Thereafter, the project management part 54 merges or takes the source project data 70 into the destination project data 70.

UI of WebHMI Development Environment

Figure 20:
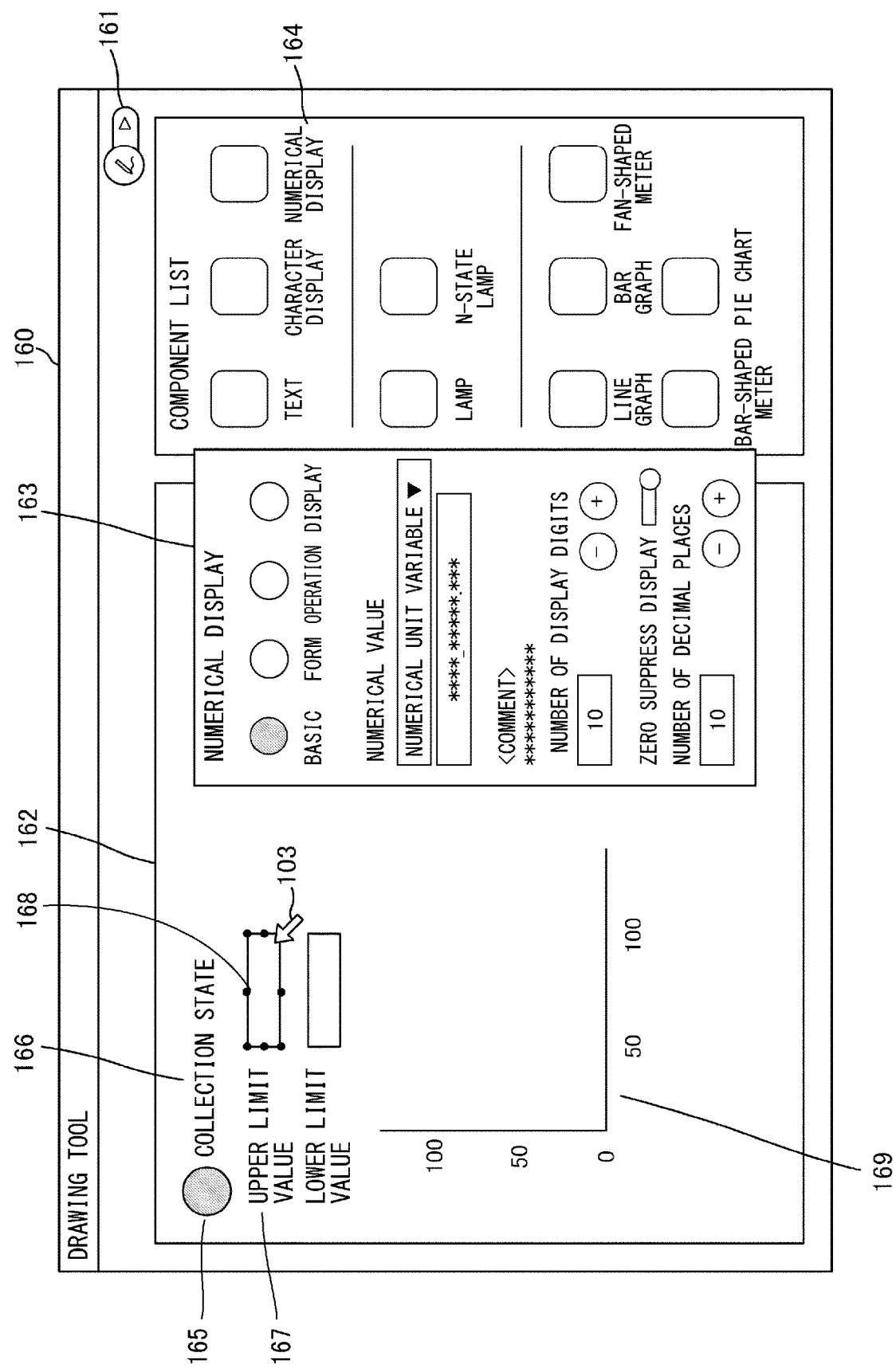
FIG. 20 is a view illustrating a UI of the WebHMI development environment.
Figure 21:
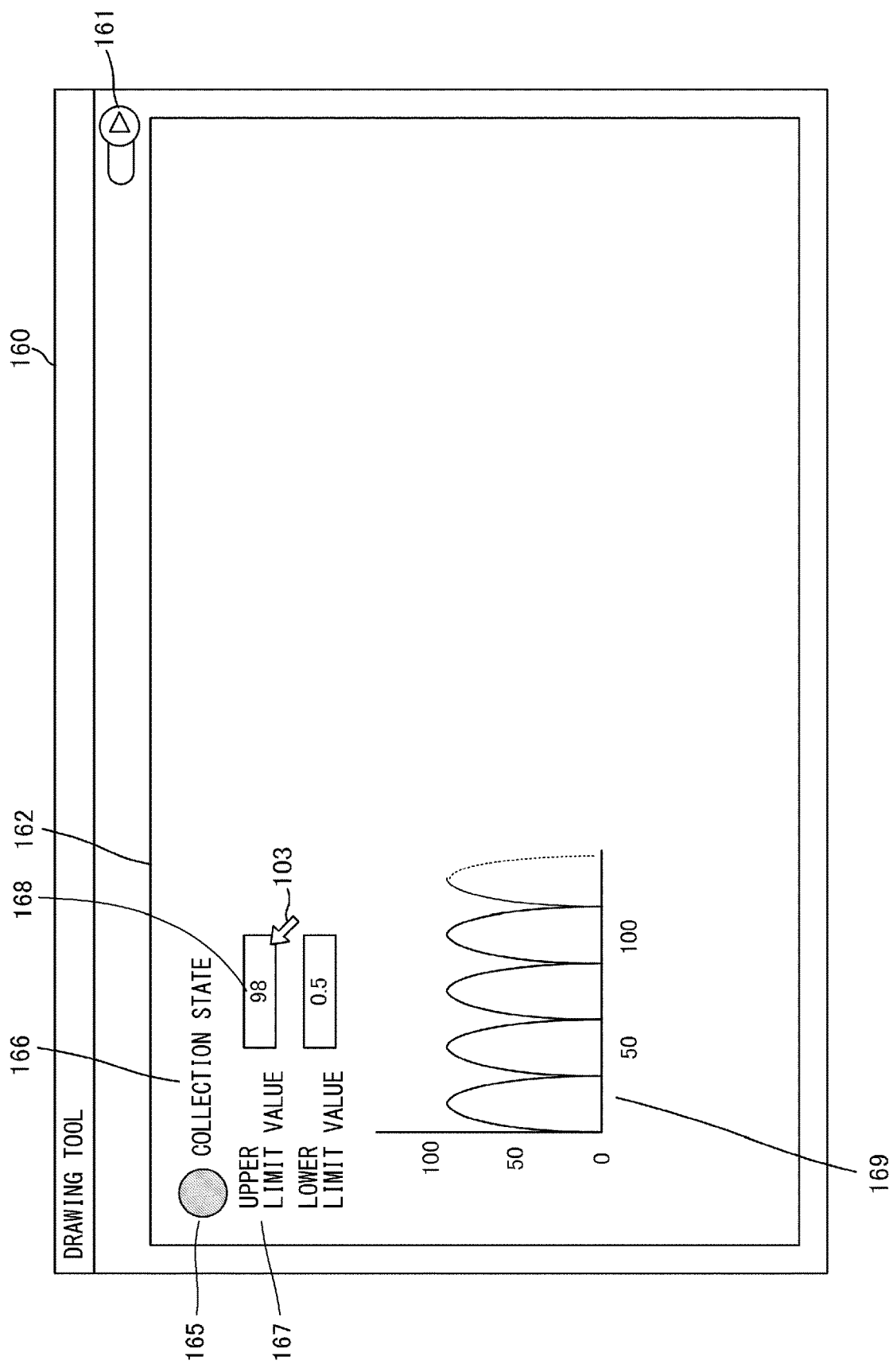
FIG. 21 is a view illustrating the UI of the WebHMI development environment.

FIGS. 20 and 21 illustrate a UI 160 of a drawing tool of the WebHMI development environment 61. A mode changeover switch 161 is a switch for switching an operation mode (e.g., the edit mode or the online edit mode) of the WebHMI development environment 61. The mode switcher 53b receives a mode switching instruction from the user via the mode changeover switch 161. In FIG. 20, the edit mode is selected.

A drawing area 162 is a display area in which one or more display components constituting WebHMI are arranged. The user drags and drops a display component displayed on a component list display part 164 with the pointer 103, thereby arranging the display component at any position in the drawing area 162. Various display components are displayed to be selectable in the component list display part 164. A text display component is a display component that displays predetermined pieces of text (e.g., characters and numbers). A character display component is a display component that refers to and displays a character held in a predetermined symbol. A type of symbol referenced by the character display component is limited to a character string. The numerical display component is a display component that displays a numerical value held in a predetermined symbol. A type of symbol referenced by the numerical display component is limited to a numerical value. A lamp display component is a display component that indicates a binary value (on and off) held in a symbol such as a bit device. An N-state lamp display component is a display component that indicates any state among N states held in a predetermined symbol using a difference in color. A chart display component is a display component that displays a numerical value held in a predetermined symbol using a graph. Examples of the chart display component may include a line graph, a bar graph, a fan-shaped meter, a bar-shaped meter, a pie chart, and the like. In addition, a display component that displays a list of alarm history data, a display component that displays a histogram, a display component that displays a Pareto chart, and a display component of a statistical view that displays a Gantt chart or the like may be presented as selectable candidates. In addition, a control component that rewrites a value of a referenced symbol may be presented to be selectable. Furthermore, a display component that displays media data, such as image data, camera data, and a drawing figure, may be displayed to be selectable.

In the drawing area 162 of FIG. 20, a lamp display component 165, a character display component 166, a text display component 167, a numerical display component 168, a chart display component 169, and the like are already arranged. In FIG. 20, a property setting window 163 for the numerical display component is also displayed since the numerical display component 168 is selected by the pointer 103. The property setting window 163 receives various settings required for displaying a numerical value. For example, a name of a referenced symbol, the number of display digits, enabling/disabling of zero suppression display, the number of decimal places, and the like are presented as setting items in the property setting window 163. The property setting window 163 for a chart component has a symbol setting item that can handle time-series data as the referenced symbol.

FIG. 21 illustrates the UI 160 in which an operation mode has been switched to the online edit mode by the mode changeover switch 161. As described above, in the online edit mode, the communication processor 58b acquires a value of a symbol that is being referenced by a display component arranged in the drawing area 162 from the PLC 1 in real time. The drawing part 63 displays the acquired value on the display component. In the online edit mode, the value is periodically acquired from the PLC 1, information displayed on the display component is also updated periodically. An update timing of the value is not necessarily periodic, and may be a timing when a predetermined condition is satisfied.

Interoperability in Numerical Display Format

In the PLC system, decimal display formats include a fixed-point number and a floating-point number. The fixed-point number refers to a scheme in which a number is represented such that the place of the decimal point is fixed. For example, if it is defined that "the first digit from the bottom is the decimal point" in the decimal system, "123" means "12.3" and "−12345" means "−1234.5". The floating-point number refers to a scheme in which a number is represented by a sign part, a fixed-length mantissa part, and a fixed-length exponential part. In C language, a floating point is handled as a float type or double type variable. In the PLC system, a floating point is handled in a format of REAL type or LREAL type.

The aligner 56b inquires of the aligner 56a about a definition of a symbol designated as a display target of the numerical display component 168 illustrated in FIG. 20. That is, a definition acquisition request is transmitted. The aligner 56a searches for and acquires the definition of the designated symbol (data format (data type) or the like), and transmits the acquired definition as a response to the aligner 56b. When the symbol is a floating-point type variable, the aligner 56b sets a display format of the variable to the floating-point number. When the symbol is an integer type variable, the aligner 56b sets a display format of the variable to the fixed-point number. The editor part 52b receives a designation by the user regarding the number of decimal places (e.g., 2) in the property file setting window 163 and passes the designation by the user to the aligner 56b. When a symbol is a floating-point type variable and an expression format thereof is the floating-point number, the aligner 56b rounds off or truncates a value of the symbol according to the number of decimal places designated by the user, and displays the value on the numerical display component 168. For example, if a symbol value is 123.45678, truncation is performed according to the designated number of decimal places (=2), so that 123.45 is displayed in the numerical display component 168. On the other hand, when a symbol is an integer type and an expression format thereof is the fixed-point number, the aligner 56b adds a decimal point to a value according to the designated number of decimal places. For example, if a symbol value is 54321 and the number of decimal places is 2, 543.21 is displayed in the numerical display component 168. In this manner, the aligner 56b acquires the data format of the symbol to be referred to by the numerical display component 168 from the PLC development environment 51, and automatically adjusts the display format of the symbol according to the display format designated by the user. In addition, the WebHMI development environment 61 may handle a value of the floating-point type symbol as the floating-point number and handle the integer type symbol as the fixed-point number. In the former, rounding off or truncation is applied according to the number of decimal places designated by the user. In the latter, a decimal point is applied according to the number of decimal places designated by the user.

In this manner, the WebHMI development environment 61 can automatically set an expression format in the WebHMI by referring to the variable type in the PLC development environment 51. Therefore, the user does not need to search information on the type in the PLC development environment 51, understand a search result, and manually set the display format (expression format) in the WebHMI development environment 61. The user only needs to designate the number of decimal places. In addition, in a calculation function in WebHMI, such as a conditional formatting function, the user can mix a floating-point number and a fixed-point number without performing any additional setting. The conditional formatting function is a function for changing a display color of a display component or changing a font based on a comparison between a symbol and a reference value. Even in the conditional formatting function, a data format in a conditional expression is automatically determined according to a type of a symbol to be displayed, and thus, the user does not need to manually change the data format. In particular, data formats are unified even if the floating-point number and the fixed-point number are mixed, and thus, the user does not need to manually set each data format.

Even if a data format of a symbol is changed from the floating-point type to the integer type or changed from the integer type to the floating-point type in the PLC development environment 51, the user can cause the display of the symbol to follow the change of the type by changing only the number of decimal places.

SUMMARY

[Viewpoint 1]

The communication part 13 is an example of a communication section that communicates with the PLC 1. The CPU 11 functions as a providing section that provides the integrated development environment 50. The integrated development environment 50 includes a first development environment (e.g., the PLC development environment 51) and a second development environment (e.g., the WebHMI development environment 61). The first development environment is a non-web application-based development environment that supports development of a user program (e.g., the control program 71a or the data utilization program 71b) to be transferred to the PLC 1 via the communication section and executed. The non-web application is a term distinguished from a web application, and may be referred to as a PC application or an OS-dependent application. The OS-dependent application is an application having different execution codes for different OSs. The second development environment is a web application-based development environment that supports development of a display screen (e.g., WebHMI) that displays a symbol value collected from the symbol (e.g., a device or a variable) used in accordance with a user program in the PLC 1. The display screen is generated as, for example, a web page that is described using data describing a structure, data describing a decoration, and a code describing dynamic processing. The web application is an application to be executed or displayed by a web browser, and may be an application that does not depend on an OS. Although the web browser is an OS-dependent application, but the web application executed by the web browser may be an application that does not depend on the OS. The display screen may be, for example, a web page that is described using HTML and CSS. As a result, provided is a programming support apparatus including the integrated development environment in which the development environment for developing the user program to be executed by the PLC 1 is integrated with the development environment of the display screen. As a result, the user can seamlessly use the development environment of the user program and the development environment of the display screen. Since the web application-based development environment is provided, the development efficiency and future function expandability of the display screen may be improved for the user. For example, since a framework (framework) of the web in the world can be used, it may be unnecessary for the user to prepare the development base from scratch. In addition, it may be unnecessary for the user to independently develop the drawing logic of the display screen. For example, a web technology widely used in the world may be used as each display component such as text, a switch, and a graph arranged on the display screen. As a result, a rich UI/UX (user experience) can be easily created for the user. Furthermore, a web element (component) created for a display screen can be reused for another display screen. In addition, it may be easy to apply components that are widely used in the world even for the display screen. Not only a structure and appearance of the web page but also behavior (operation at the time of clicking, interpretation of data, and the like) may be easily applied to the display screen. In addition, interference in style or behavior between a certain component and another component is unlikely to occur due to componentization of the display components in the display screen. In addition, development and maintenance per component are possible, and thus, the development efficiency and maintenance efficiency may be improved.

[Viewpoint 2]

The CPU 11 (providing section) may be configured to manage the user program and a display component configured to draw the display screen as a single project. Conventionally, a project of the user program and a project of the display screen of WebHMI are separated, and the management burden on the user is heavy. These can be managed as the single project in the present embodiment, and thus, the burden on the user is reduced.

[Viewpoint 3]

The project may include the user program created through the first development environment, symbol definition information (e.g., the symbol definition 72), and configuration information (the configuration information 74) of the programmable logic controller. Furthermore, the project may include a display component (e.g., the display component 73) of the display screen created through the second development environment. Here, the display component may include reference information for referring to a symbol holding information displayed on the display screen.

[Viewpoint 4]

The search part 57 may function as a common search section that is called from the first development environment and the second development environment, and performs a search throughout the project. As a result, the user can perform the search with the single search function throughout the project. As a result, the user can more seamlessly use the development environment of the user program and the development environment of the display screen.

[Viewpoint 5]

The first development environment and the second development environment may execute assistance of an input of a user (e.g., input assistance of a symbol name) or an error check of information (e.g., a symbol name) input by the user using a search result obtained by the common search section. As a result, the burden on the user regarding the input of the symbol or the like may be reduced. In addition, as a result, the user can more seamlessly use the development environment of the user program and the development environment of the display screen.

[Viewpoint 6]

The CPU 11 (providing section) may acquire the symbol value from the programmable logic controller via the communication section, and display the symbol value in association with the user program in the first development environment. For example, when an operation mode is set to a monitor mode, the PLC development environment 51 may display a device value (e.g., on/off or an analog value) acquired from the PLC 1 on a device described in a ladder program. The CPU 11 (providing section) may display the symbol value on the display screen. For example, the CPU 11 may acquire a symbol value of a symbol referred to by a display component of WebHMI from the PLC 1, and display such a device value using the display component of WebHMI. In this manner, during development of a display screen, the user can immediately confirm how the display screen is to appear at the time of being actually operated. For example, it is possible to confirm the appearance of WebHMI directly in the development environment of WebHMI without starting a general-purpose web browser each time during debugging of WebHMI.

[Viewpoint 7]

The first development environment may have a first web server (e.g., the web server 60a) that communicates with the second development environment in accordance with a Web API. The second development environment may acquire, via the first web server, definition information of a symbol associated with a display component constituting the display screen, the definition information being created in the first development environment. Furthermore, the second development environment may reflect the definition information on the display component configured to draw the display screen. For example, when a device comment of a device in the PLC development environment 51 has been created and the WebHMI development environment 61 refers to the device by a display component, the WebHMI development environment 61 may acquire the device comment from PLC development environment 51 and display the device comment in association with the display component. As a result, the user can more seamlessly use the development environment of the user program and the development environment of the display screen.

[Viewpoint 8]

The PLC 1 may include a second web server (e.g., the web server 60b) that reflects and provides information stored in the symbol on the display screen created by the second development environment. The second development environment includes a web browser (e.g., the embedded browser 62 or the web browser 64) that accesses the second web server via the first web server and displays the display screen. As a result, during development of a display screen, the user can immediately confirm how the display screen is to appear at the time of being actually operated.

[Viewpoint 9]

The first development environment and the PLC 1 may provide TCP transparent communication to the web browser and the second web server. The TCP transparent communication is achieved by, for example, encapsulation of a communication frame by the protocol converters 59a and 59b and the communication processors 58a, 58b, and 58c.

[Viewpoint 10]

The integrated development environment 50 may have an editor mode of receiving editing of the user program in the first development environment, and receiving editing of the display screen in the second development environment. The integrated development environment 50 may have a monitor mode of acquiring and displaying a symbol value from the programmable logic controller from a symbol associated with the user program in the first development environment, and acquiring a symbol value of a symbol associated with the display screen in the second development environment from the programmable logic controller and displaying the symbol value on the display screen. Each of the first development environment and the second development environment may have an instruction section that instructs switching between the editor mode and the monitor mode. For example, the mode selection menu 101 is an example of the instruction section. As a result, the user can more seamlessly use the development environment of the user program and the development environment of the display screen. In addition, during development of a display screen, the user can immediately confirm how the display screen is to appear at the time of being actually operated.

[Viewpoint 11]

A web server provided in the first development environment and a web application to be executed in the embedded browser provided in the second development environment may communicate via a Web API. As a result, the first development environment and the second development environment may cooperate for creation or management of a project including the user program and a display component of the display screen. As a result, the user can more seamlessly use the development environment of the user program and the development environment of the display screen.

[Viewpoint 12]

The first development environment and the second development environment may make an operation mode of the first development environment and an operation mode of the second development environment match each other through the cooperation via the Web API. For example, when the operation mode of the WebHMI development environment 61 is switched from the editor mode to the monitor mode, the operation mode of the PLC development environment 51 is also switched from the editor mode to the monitor mode. As a result, the burden on the user regarding the switching of the operation mode is reduced.

[Viewpoint 13]

As described with reference to FIGS. 8 to 11, the first development environment and the second development environment may prohibit a user operation with respect to the first development environment and a user operation with respect to the second development environment when switching the operation mode. As a result, the user can safely switch the operation mode.

[Viewpoint 14]

When switching of the operation mode has been instructed, the first development environment and the second development environment may prohibit the switching of the operation mode in a case where at least one of the first development environment and the second development environment is in a busy state or is displaying a dialog. As a result, the user can safely switch the operation mode.

[Viewpoint 15]

As described with reference to FIG. 12, the first development environment may be configured to receive an instruction to start the second development environment and start the second development environment. As a result, the user may be able to further benefit from the integrated development environment.

[Viewpoints 16 and 17]

The first development environment and the second development environment may make a language setting of the first development environment and a language setting of the second development environment match each other through the cooperation via the Web API. The first development environment and the second development environment may make a comment set of the first development environment and a comment set of the second development environment match each other through the cooperation via the Web API. The language setting means a setting of a display language (Japanese, English, French, Chinese, or the like) of the integrated development environment 50. The comment set is, for example, a group (set) of comments of a plurality of display components to be applied to WebHMI. For example, there is a case where different comment sets are prepared in different languages, such as a comment set in English and a comment set in Japanese. If different display languages or different comment sets are applied in the first development environment and the second development environment, the user may be confused. Therefore, the language settings or comment sets are made to match each other, so that the burden on the user regarding switching the language setting or the comment set is reduced.

[Viewpoint 18]

The transfer part 55 is an example of a transfer section that transfers a project created in the integrated development environment to the programmable logic controller. The transfer part 55 may check the consistency between a symbol described in the user program included in the project and a symbol that is referred to by a display component of the display screen. Note that a conversion function and an inspection function of the project data 70 may be provided inside the transfer part 55 or may be provided outside the transfer part 55.

[Viewpoints 19 to 23]

The project management part 54 may function as an import section that executes import of the project. When a first project is imported into a second project, the project management part 54 may be configured to update the first project so as to make a description depending on a unit configuration in the first project consistent with a unit configuration of the second project, and import the updated first project into the second project. Here, the description depending on the unit configuration may include a description of identification information (e.g., a buffer memory number) of a symbol that changes depending on the unit configuration.

Here, in regard to the import, automatic correction of a project accompanying a difference in unit configuration is described. However, this is also effective in other situations. For example, when the configuration information 74 defining the unit configuration has been changed in the PLC development environment 51, it is necessary to correct the reference information 76a or 76b of the symbol depending on the unit configuration in the WebHMI development environment 61. Even in this case, the WebHMI development environment 61 can appropriately correct the reference information 76b of the symbol as the PLC development environment 51 corrects the reference information 76a of the symbol and transmits a change request for the reference information 76b of the symbol to the WebHMI development environment 61. Here, the change request may indicate a unit number before change and a changed unit number. As a result, the WebHMI development environment 61 may be able to easily correct the reference information 76b of the symbol.

As described with reference to FIG. 19, the project management part 54 may associate a description of a symbol, associated with first identification information in the first project, with second identification information in accordance with an input of the user indicating a correspondence relationship between the first identification information of an expansion unit included in the unit configuration of the first project and the second identification information of an expansion unit included in the unit configuration of the second project. As a result, the burden on the user regarding the correction work of the identification information may be reduced.

When identification information of unitarily managed data, such as image data, video data, and audio data included in the first project, is already used in the second project, the project management part 54 may change the identification information of the image data to unused identification information in the second project. As a result, the burden on the user regarding the correction work of the identification information may be reduced.

[Viewpoints 24 to 26]

The second development environment (e.g., the WebHMI development environment 61) may acquire a type of a symbol associated with a display component constituting the display screen from the first development environment. The second development environment may set a display format of a symbol value in the display component according to the type. For example, the second development environment may set the display format of the symbol value in the display component to a floating-point number when the type of the symbol is a floating-point type. The second development environment may set the display format of the symbol value in the display component to a fixed-point number when the type of the symbol is an integer type. The second development environment may receive a designation of the number of decimal places for the symbol value, add display the symbol value on the display component by adding a decimal point according to the number of decimal places. When the first development environment and the second development environment are independent, the user needs to define or declare a type of a symbol in the first development environment and manually set a display format for the symbol in the second development environment, which is extremely troublesome. On the other hand, the first development environment and the second development environment are integrated and can cooperate with each other in the present embodiment. Therefore, the second development environment can request for the type of the symbol with respect to the first development environment, and set the display format according to the type. Therefore, the burden on the user is reduced.

The invention is not limited to the above embodiment, and various modifications and changes can be made within a scope of a gist of the invention.

What is claimed is:

1. A programming support apparatus comprising:
   a central processing unit (CPU) that executes:
   a communication section configured to communicate with a programmable logic controller; and
   a providing section configured to provide an integrated development environment in which a non-web application-based first development environment, which supports development of a user program to be transferred to the programmable logic controller via the communication section and executed, is integrated with a web application-based second development environment that supports development of a display screen by generating the display screen, which displays a symbol value collected from a symbol used in accordance with the user program executed in the programmable logic controller, as a web page that is described using data describing a structure, data describing a decoration, and a code describing dynamic processing.

2. The programming support apparatus according to claim 1, wherein the providing section is further configured to manage the user program, and further comprising a display component configured to draw the display screen as a single project.

3. The programming support apparatus according to claim 2, wherein the single project includes:
   the user program created through the non-web application-based first development environment, symbol definition information, and configuration information of the programmable logic controller; and
   a display component of the display screen created through the web application-based second development environment, and the display component of the display screen includes reference information for referring to a symbol holding information displayed on the display screen.

4. The programming support apparatus according to claim 2, further comprising:
a common search section configured to be called from the non-web application-based first development environment and the web application-based second development environment and performs a search throughout the single project.

5. The programming support apparatus according to claim 4, wherein the non-web application-based first development environment and the web application-based second development environment execute assistance of an input of a user or an error check of information input by the user using a search result obtained by the common search section.

6. The programming support apparatus according to claim 1, wherein the providing section is further configured to acquire the symbol value from the programmable logic controller via the communication section, and display the symbol value in association with the user program in the non-web application-based first development environment, or display the symbol value on the display screen.

7. The programming support apparatus according to claim 1, wherein:
the non-web application-based first development environment includes a first web server that communicates with the web application-based second development environment in accordance with a web application programming interface (Web API), and
the web application-based second development environment acquires, via the first web server, definition information of a symbol associated with a display component constituting the display screen, wherein the definition information of the symbol is created in the non-web application-based first development environment, and reflects the definition information of the symbol on the display component configured to draw the display screen.

8. The programming support apparatus according to claim 7, wherein:
the programmable logic controller includes a second web server that reflects and provides information stored in the symbol on the display screen created by the web application-based second development environment, and
the web application-based second development environment includes a web browser that accesses the second web server via the first web server and displays the display screen.

9. The programming support apparatus according to claim 8, wherein the non-web application-based first development environment and the programmable logic controller are configured to provide transmission control protocol (TCP) transparent communication to the web browser and the second web server.

10. The programming support apparatus according to claim 1, wherein the integrated development environment includes:
an editor mode of receiving editing of the user program in the non-web application-based first development environment, and receiving editing of the display screen in the web application-based second development environment; and
a monitor mode of acquiring and displaying a symbol value from a symbol associated with the user program in the non-web application-based first development environment, and acquiring a symbol value of a symbol associated with the display screen in the web application-based second development environment from the programmable logic controller and displaying the symbol value of the symbol on the display screen, and
each of the non-web application-based first development environment and the web application-based second development environment includes an instruction section configured to instruct switching between the editor mode and the monitor mode.

11. The programming support apparatus according to claim 1, wherein the non-web application-based first development environment and the web application-based second development environment cooperate for creation or management of a project including the user program and a display component of the display screen by communication via a web application programming interface (Web API) between a web server provided in the non-web application-based first development environment and a web application to be executed in an embedded browser provided in the web application-based second development environment.

12. The programming support apparatus according to claim 11, wherein the non-web application-based first development environment and the web application-based second development environment make an operation mode of the non-web application-based first development environment and an operation mode of the web application-based second development environment match each other through the cooperation via the Web API.

13. The programming support apparatus according to claim 12, wherein the non-web application-based first development environment and the web application-based second development environment prohibit a user operation with respect to the non-web application-based first development environment and a user operation with respect to the web application-based second development environment when switching the operation mode of the non-web application-based first development environment and the operation mode of the web application-based second development environment.

14. The programming support apparatus according to claim 12, wherein when switching of the operation mode of the non-web application-based first development environment and the operation mode of the web application-based second development environment has been instructed, the non-web application-based first development environment and the web application-based second development environment prohibit the switching of the operation mode of the non-web application-based first development environment and the operation mode of the web application-based second development environment in a case where at least one of the non-web application-based first development environment and the web application-based second development environment is in a busy state or is displaying a dialog.

15. The programming support apparatus according to claim 11, wherein the non-web application-based first development environment and the web application-based second development environment make a language setting of the non-web application-based first development environment and a language setting of the web application-based second development environment match each other through the cooperation via the Web API.

16. The programming support apparatus according to claim 11, wherein the non-web application-based first development environment and the web application-based second development environment make a comment set of the non-web application-based first development environment and a comment set of the web application-based second development environment match each other through the cooperation via the Web API.

17. The programming support apparatus according to claim 1, wherein the non-web application-based first development environment is configured to receive an instruction to start the web application-based second development environment.

18. The programming support apparatus according to claim 1, further comprising:
   a transfer section configured to transfer a project created in the integrated development environment to the programmable logic controller, and check consistency between a symbol described in the user program included in the project and a symbol that is referred to by a display component of the display screen.

19. The programming support apparatus according to claim 18, further comprising:
   an import section configured to execute an import of the project.

20. The programming support apparatus according to claim 19, wherein when a first project is imported into a second project, the import section is further configured to update the first project so as to make a description depending on a unit configuration of the first project consistent with a unit configuration of the second project, and import the updated first project into the second project.

* * * * *